United States Patent
Rizzo

(10) Patent No.: US 10,537,490 B2
(45) Date of Patent: Jan. 21, 2020

(54) SOMATOSENSORY FEEDBACK WEARABLE OBJECT

(71) Applicant: NEW YORK UNIVERSITY, New York, NY (US)

(72) Inventor: John-Ross Rizzo, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 0 days.

(21) Appl. No.: 15/589,973

(22) Filed: May 8, 2017

(65) Prior Publication Data

US 2017/0239130 A1 Aug. 24, 2017

Related U.S. Application Data

(63) Continuation-in-part of application No. 14/404,275, filed as application No. PCT/US2013/043919 on Jun. 3, 2013, now abandoned, application No. 15/589,973, filed on May 8, 2017, which is a continuation-in-part of application No. 14/438,193, filed as application No. PCT/US2013/066404 on Oct. 23, 2013, now Pat. No. 9,646,514.

(60) Provisional application No. 61/654,449, filed on Jun. 1, 2012, provisional application No. 61/717,526, filed on Oct. 23, 2012.

(51) Int. Cl.
*A61H 3/04* (2006.01)
*A61H 3/06* (2006.01)
*G09B 21/00* (2006.01)
*G06F 3/01* (2006.01)

(52) U.S. Cl.
CPC ............... *A61H 3/04* (2013.01); *A61H 3/061* (2013.01); *G06F 3/016* (2013.01); *G09B 21/00* (2013.01); *G09B 21/003* (2013.01)

(58) Field of Classification Search
CPC ...... A61H 3/04; A61H 3/06; A61H 2003/063; A61H 3/068; A61H 2003/0272; A45B 1/02; A45B 9/04
USPC ..... 135/65, 66, 76, 78, 85, 911; 248/171, 98
See application file for complete search history.

(56) References Cited

U.S. PATENT DOCUMENTS

| | | | | |
|---|---|---|---|---|
| 1,494,508 A | * | 5/1924 | Smith | A61H 3/066 135/85 |
| 1,527,239 A | * | 2/1925 | Vaughan | A61H 3/068 135/65 |
| 2,683,461 A | * | 7/1954 | Kinney | A61H 3/068 135/65 |
| 2,843,180 A | * | 7/1958 | Schwartz | A61H 3/04 280/62 |
| 4,091,828 A | * | 5/1978 | Jorgensen | F16M 13/08 135/66 |
| 4,892,279 A | * | 1/1990 | Lafferty | A61M 5/1415 248/125.8 |
| 4,962,781 A | * | 10/1990 | Kanbar | A45B 1/02 135/65 |

(Continued)

*Primary Examiner* — Noah Chandler Hawk
(74) *Attorney, Agent, or Firm* — Foley & Lardner LLP

(57) ABSTRACT

A cane that includes a handle and a pylon that includes a satellite leg control operably connected to the handle. The cane further includes a terminal feedback device that is operably connected to the pylon and slidable relative thereto for retracting the terminal feedback device to expose a cane tip. The terminal feedback device includes a plurality of satellite legs. The terminal feedback device also includes a plurality of wheels. Each wheel is operably connected to a satellite leg.

10 Claims, 24 Drawing Sheets

(56) References Cited

U.S. PATENT DOCUMENTS

| | | | | |
|---|---|---|---|---|
| 5,056,545 A | * | 10/1991 | Spaeth | A45B 1/00 135/66 |
| 5,188,138 A | * | 2/1993 | Yamasaki | A61H 3/04 135/65 |
| 5,533,536 A | * | 7/1996 | Hong | A61H 3/02 135/65 |
| 7,802,764 B2 | * | 9/2010 | Leinen | A61M 5/1415 248/129 |
| 2007/0175503 A1 | * | 8/2007 | Gordon | A45B 9/04 135/65 |
| 2008/0251110 A1 | * | 10/2008 | Pede | A61H 3/061 135/66 |

* cited by examiner

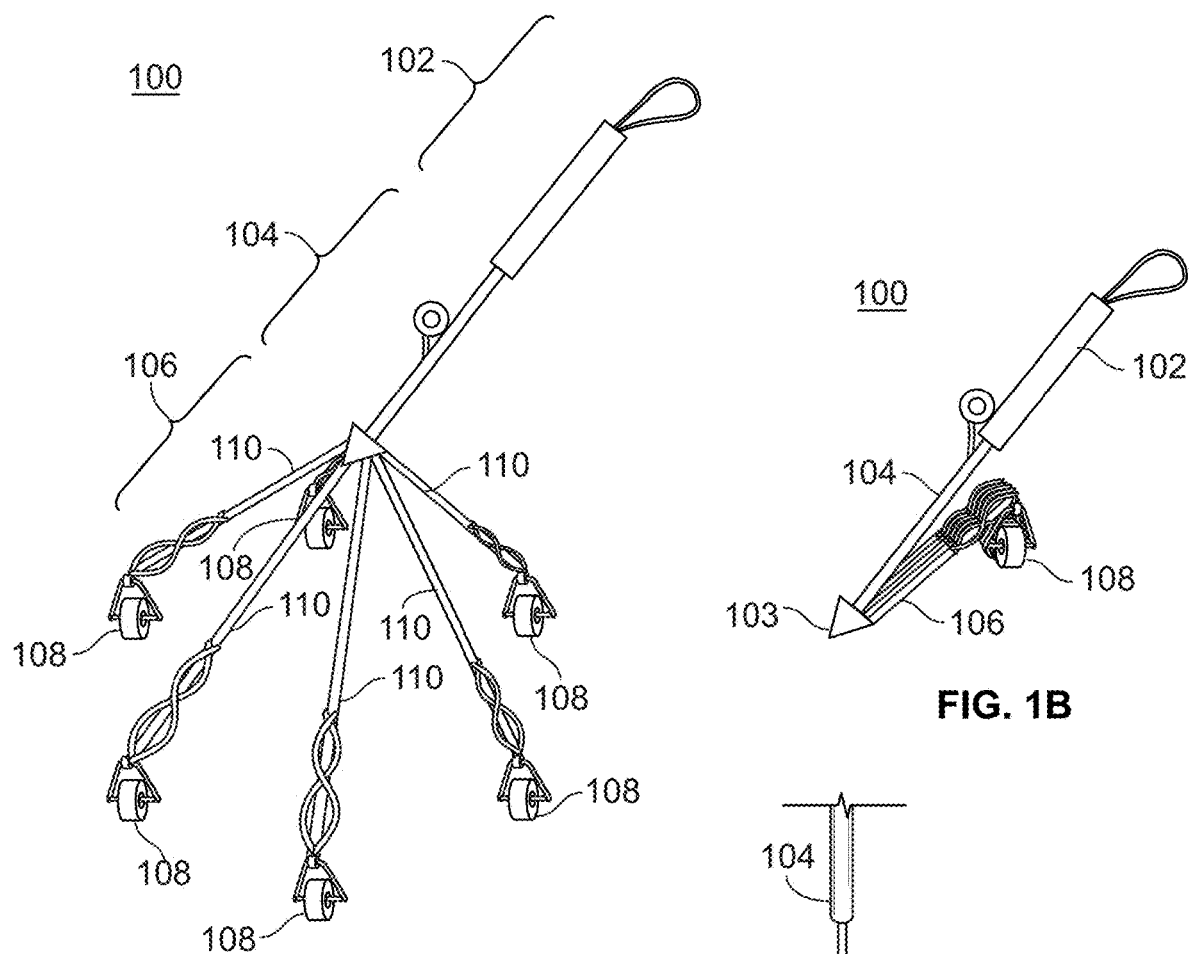
FIG. 1A
FIG. 1B
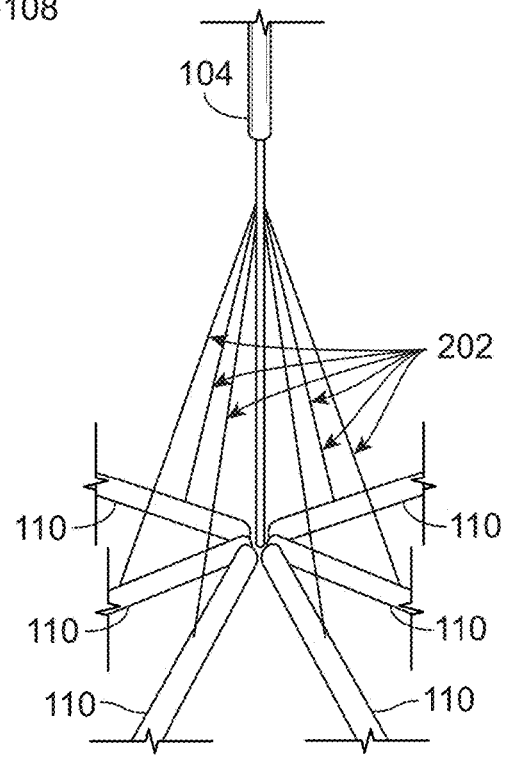
FIG. 2

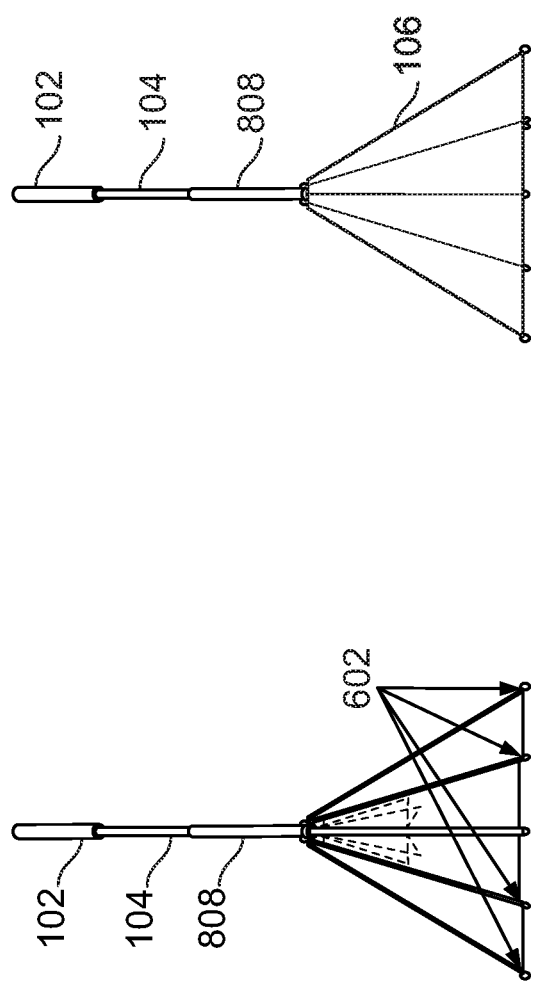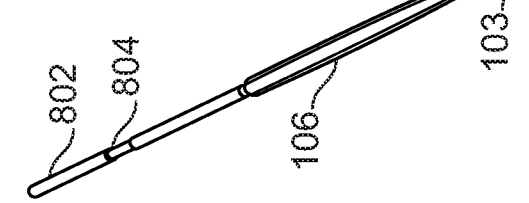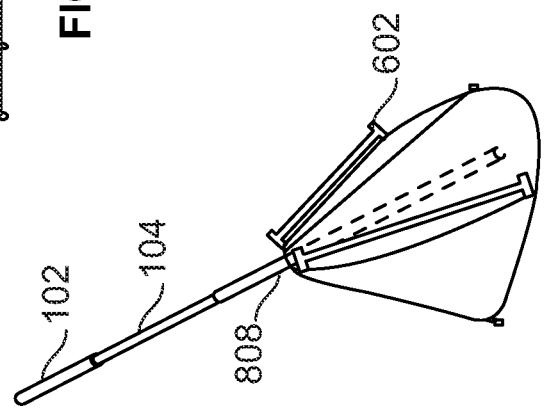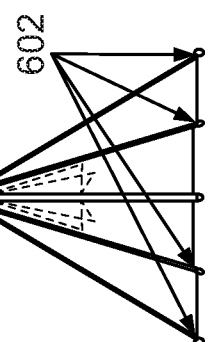

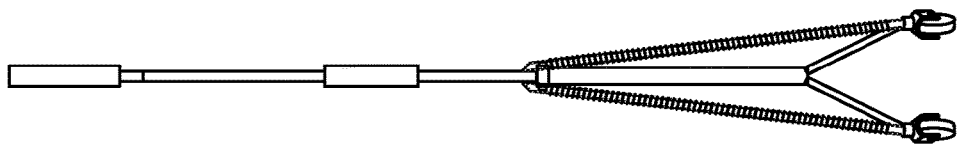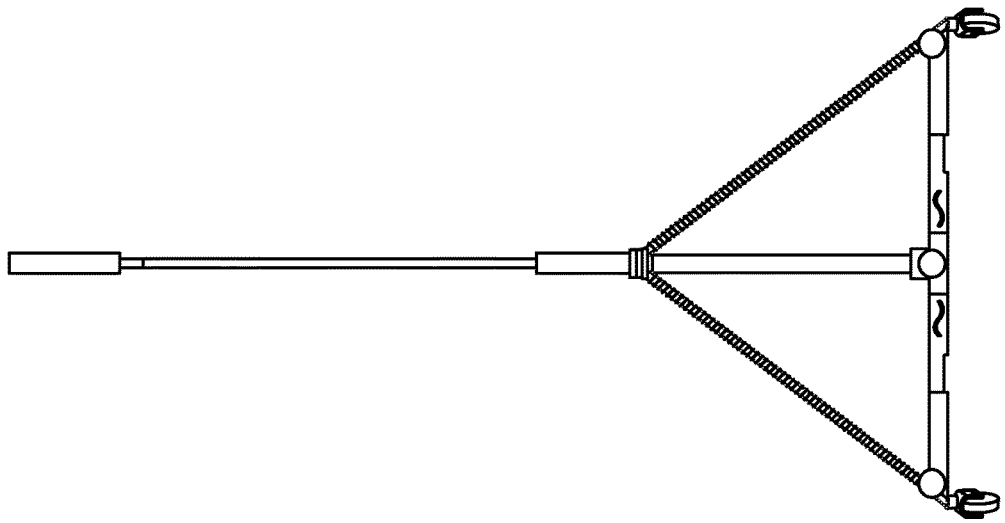

Retracted (Closed)

Retracting.. (Closing)

Deployed (Open)

Retracted (Closed)

Deployed (Open)

SOMATOSENSORY FEEDBACK WEARABLE OBJECT

CROSS REFERENCE TO RELATED APPLICATIONS

This application is a continuation-in-part of U.S. patent application Ser. No. 14/438,193 which is the U.S. National Phase of PCT/US2013/066404 filed Oct. 23, 2013, which claims priority to U.S. Provisional Patent Application No. 61/717,526 filed Oct. 23, 2012, all of which are incorporated by reference herein in their entirety.

This application is also a continuation-in-part of U.S. patent application Ser. No. 14/404,275 which is the U.S. National Phase of PCT/US2013/043919 filed Jun. 3, 2013, which claims priority to U.S. Provisional Patent Application No. 61/654,449 filed Jun. 1, 2012, all of which are incorporated by reference herein in their entirety.

BACKGROUND

In 2010, the WHO estimated that there were 285 million globally with visual impairment, 39 million of who were "blind" and 246 million who had "low vision." A traditional white cane is a common tool used by blind or low vision people. James Biggs, a photographer blinded following an accident, invented the white cane in 1921; he found it prudent to paint his walking stick white as a symbol of his impairment for the heavy traffic surrounding his domicile. This movement was later fostered by Guilly d'Herbemont of France in 1931 for the French veterans of WWI. Individuals and companies have attempted to further the advancement of the white cane or navigating tools. However, at the end of the day prosthetics departments offer amputees complex $70,000 joint components and our visual occupational therapists offer our legally blind a simple, modified, low profile, white cane tip. Simply observing a visually impaired individual ambulate with a conventional white cane over several minutes on a Manhattan street provides enough encouragement to redefine their assistive device.

SUMMARY

In general, one aspect of the subject matter described in this specification can be embodied systems, computer-readable mediums, and methods for receiving, from a sensor array, three-dimensional sensory data associated with an environment of a person. The three-dimensional sensory data is converted into a two-dimensional representation. An obstacle is located within the environment based upon the sensory data. The obstacle is mapped onto the two-dimensional representation and the two-dimensional representation is mapped onto a plurality of actuators within a vibrotactile interface. One or more of a plurality of actuators are controlled based upon the mapping of the two-dimensional representation onto the plurality of actuators to provide tactile input to the person that represents a location of the obstacle.

In general, one aspect of the subject matter described in this specification can be embodied in a cane that includes a handle and a pylon that includes a satellite leg control operably connected to the handle. The cane further includes a terminal feedback device that is operably connected to the pylon. The terminal feedback device includes a plurality of satellite legs and a plurality of suspension systems. Each satellite leg is operably connected to a single suspension system. The terminal feedback device also includes a plurality of wheels on individual axles. Each wheel is operably connected to a single satellite leg.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are; therefore, not to be considered limiting of its scope, the disclosure will be described with additional specificity and detail through use of the accompanying drawings.

FIG. 1A illustrates a somatosensory terminal feedback cane in an open position in accordance with various illustrative implementations.

FIG. 1B illustrates a somatosensory terminal feedback cane in a closed position in accordance with various illustrative implementations.

FIG. 2 illustrates cables connecting struts of a somatosensory terminal feedback cane with a pylon in accordance with various illustrative implementations.

FIGS. 6A-6F illustrate a somatosensory terminal feedback cane in accordance with various illustrative implementations.

FIGS. 8A-8H illustrate a two-wheel somatosensory terminal feedback cane in accordance with various illustrative implementations.

Figure 3A:
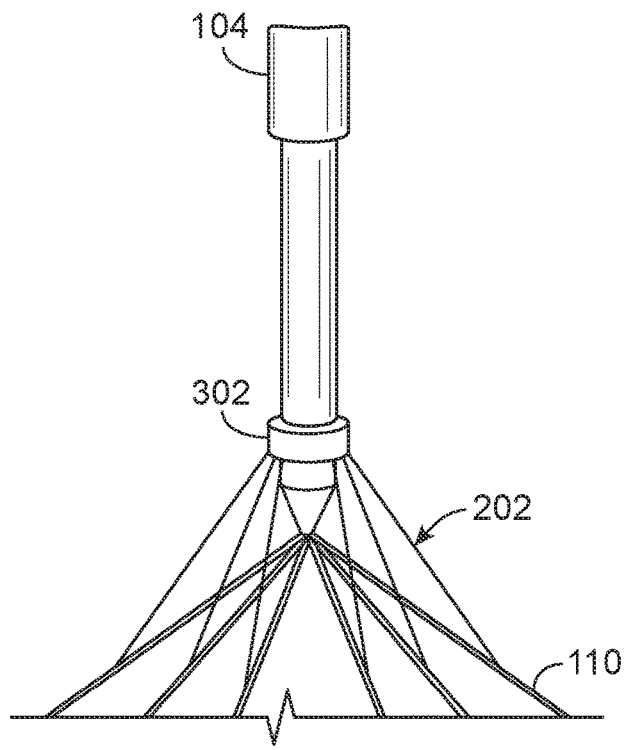
FIG. 3A illustrates a sliding cuff (strut control) of a somatosensory terminal feedback cane in an open position in accordance with various illustrative implementations.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

The current disclosure describes a somatosensory terminal feedback cane that alters the conventional white cane and rehabilitation principles in navigation assistance. The somatosensory terminal feedback cane described in detail below can provide a more consistent, reliable, versatile, and enhanced tactile feedback to the visually impaired during ambulation. Implementations of the present invention include a somatosensory enhancing tool that provides increased feedback for the visually challenged to enhance travel. This allows for more consistent and more reliable environmental information within an adequate time window to allow response and redirection by the user.

FIG. 1A illustrates a somatosensory terminal feedback cane 100 in an open position in accordance with various illustrative implementations. The somatosensory terminal feedback cane 100 can include three components: a handle/control system 102, a pylon 104, and a terminal feedback device 106. In one implementation, the terminal feedback device 106 can be a hexagonal base with six wheels 108. The wheels 108 can be small, satellite, uni-axle wheels 108 on independent suspension systems. In other implementations, a different number of wheels can be utilized. For example, the number of wheels can be, but is not limited to, 2, 3, 4, 7, 8, 10, etc. The six axles can be connected to the pylon 104 by six struts 110 affixed to the pylon 104 with vertical displacement joints. The pylon 104 may be fitted with a small conventional white cane tip 103 several inches below the distal end of the pylon 106, a feature of the device that will be implemented when the struts are retracted or flexed and closed. This will allow navigation in a crowded area or the interior of an edifice as opposed to street navigation.

Figure 3B:
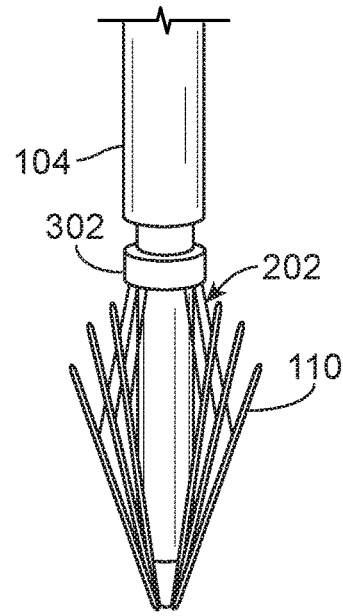
FIG. 3B illustrates a sliding cuff (strut control) of a somatosensory terminal feedback cane in a closed position in accordance with various illustrative implementations.

FIG. 2 illustrates cables connecting struts of a somatosensory terminal feedback cane with a pylon in accordance with various illustrative implementations. Each cable 202 can be connected to a single strut 110. The cable 202 can attach to either the distal portion or a midportion of the strut 110. The cables 202 in conjunction with the vertical joints allow the struts 110 and suspension systems to be withdrawn with a harness/cable set-up deployed at the proximal end of the pylon 106. In one implementation, a sliding cuff 302 can be affixed to the proximal end of the cables 202. The sliding cuff 302 can move over a portion of the pylon 104. As the sliding cuff 302 moves, the cables 202 attached to the struts 110 can pull or release the struts 110 to move the somatosensory terminal feedback cane into a closed or open position. In one implementation, each strut 110 can be attached to the pylon 104 via a hinge. As the sliding cuff 302 moves, the struts 110 can move based upon the hinge. FIG. 3A illustrates a sliding cuff 302 of a somatosensory terminal feedback cane in an open position in accordance with various illustrative implementations. In one implementation, the struts descend 110 degrees from the pylon 104 in the open position. Other degrees of descent can also be use, such as, but not limited to, 60, 90, 120, 145, etc. FIG. 3B illustrates a sliding cuff of a somatosensory terminal feedback cane in a closed position in accordance with various illustrative implementations. In FIG. 3B, the sliding cuff 302 has moved into an up or strut flexed position. In one implementation, the sliding cuff 302 can lock into various positions at degree intervals. For example, from the closed position, the sliding cuff 302 can lock into position when the struts 110 have been lowered 60 degrees. Continuing to push on the sliding cuff 302 can allow the struts to open to another locked position, e.g., 120 degrees. Different degree intervals and non-consecutive intervals can be used for locking the cane into different positions. As another example, from the closed position, a cane can first lock at 110 degrees and have a second locking position at 120 degrees.

A somatosensory terminal feedback cane can provide improved tactile feedback to the visually impaired as they ambulate in an outdoor and indoor environment. The traditional white cane is implemented by the user in a sweeping movement, covering the territory the subject may need to progress forward in his or her immediate space. This offers inconsistent feedback depending on the fashion in which the subject swings the white cane in relationship to how he or she advances forward. For example, a user that steps forward with a right leg while swinging left to right can have different feedback compared to a user that swings right to left or steps forward with a left leg. In addition, the traditional white cane can itself become a hindrance. For example, a visually impaired subject can swing the traditional white cane around an approaching obstacle and then stumble based upon the cane's contact with the approaching obstacle, e.g., the scaffolding that the white cane gets hung up on during the "swing" phase.

Navigating with a somatosensory terminal feedback cane will involve a key difference compared to navigation with a traditional white cane: a static position with regard to lateral movement of the cane. The somatosensory terminal feedback cane can be placed approximately three feet in front of the subject and wheeled forward as the subject receives tactile feedback from each individual wheel as it elevates, depresses, increases or decreases in speed (perhaps indicating a floor material change, e.g., hardwood versus carpet), is stymied by an approaching obstacle, etc. In one implementation, the diameter of the somatosensory terminal feedback cane can be approximately the width of the individual. There is no need to swing the cane. Further, the user does not have to move his or her arm to sweep the cane across their path. This can lead to reduced confusion between limb advancement and device advancement. In the illustrated implementation of FIG. 1A, the six independently suspended wheels 108 can create ease of progression in space and also provide enhanced feedback to the user over a larger three-dimensional space footprint. This can significantly improve ambulation outdoors. In some implementations, the somatosensory terminal feedback cane can be converted into a traditional white cane. For example, in a crowded environment, based on a simple cable system, the six spokes of the terminal feedback cane retract to reveal a simple cane tip 103 to be used in tighter spaces.

Figure 4:
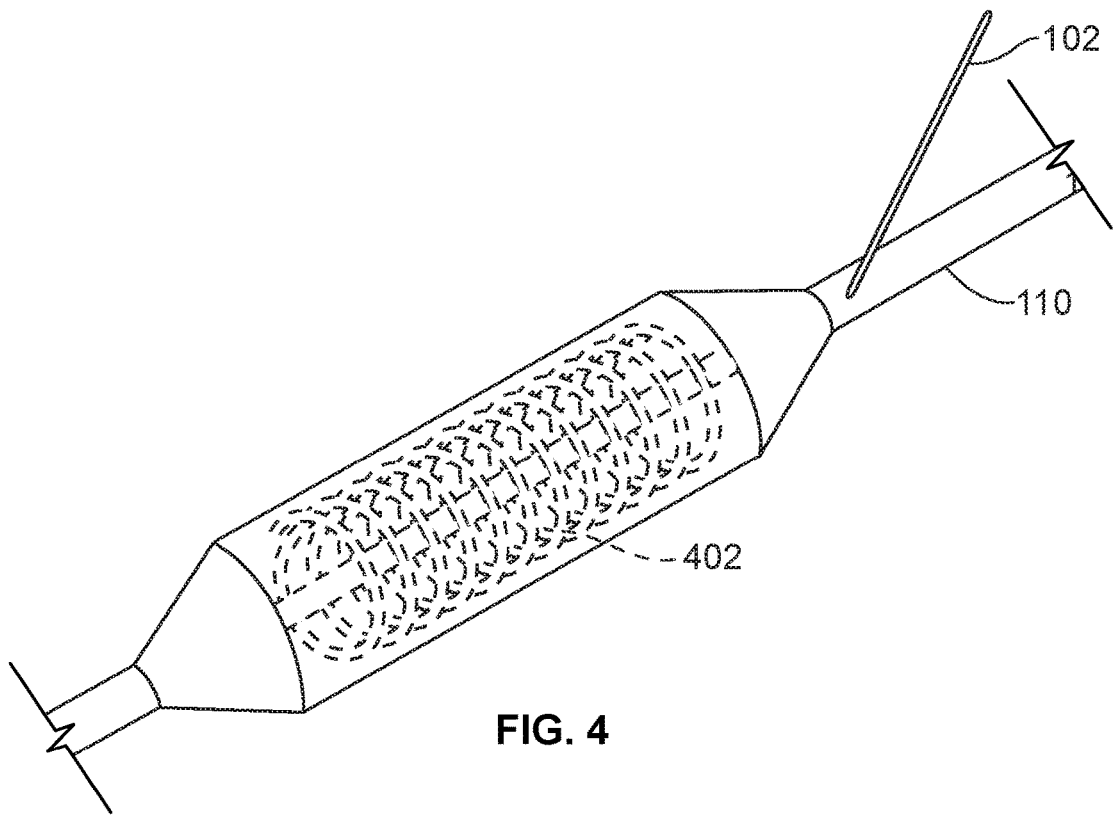
FIG. 4 illustrates a spring suspension system of a strut in accordance with various illustrative implementations.
Figure 5:
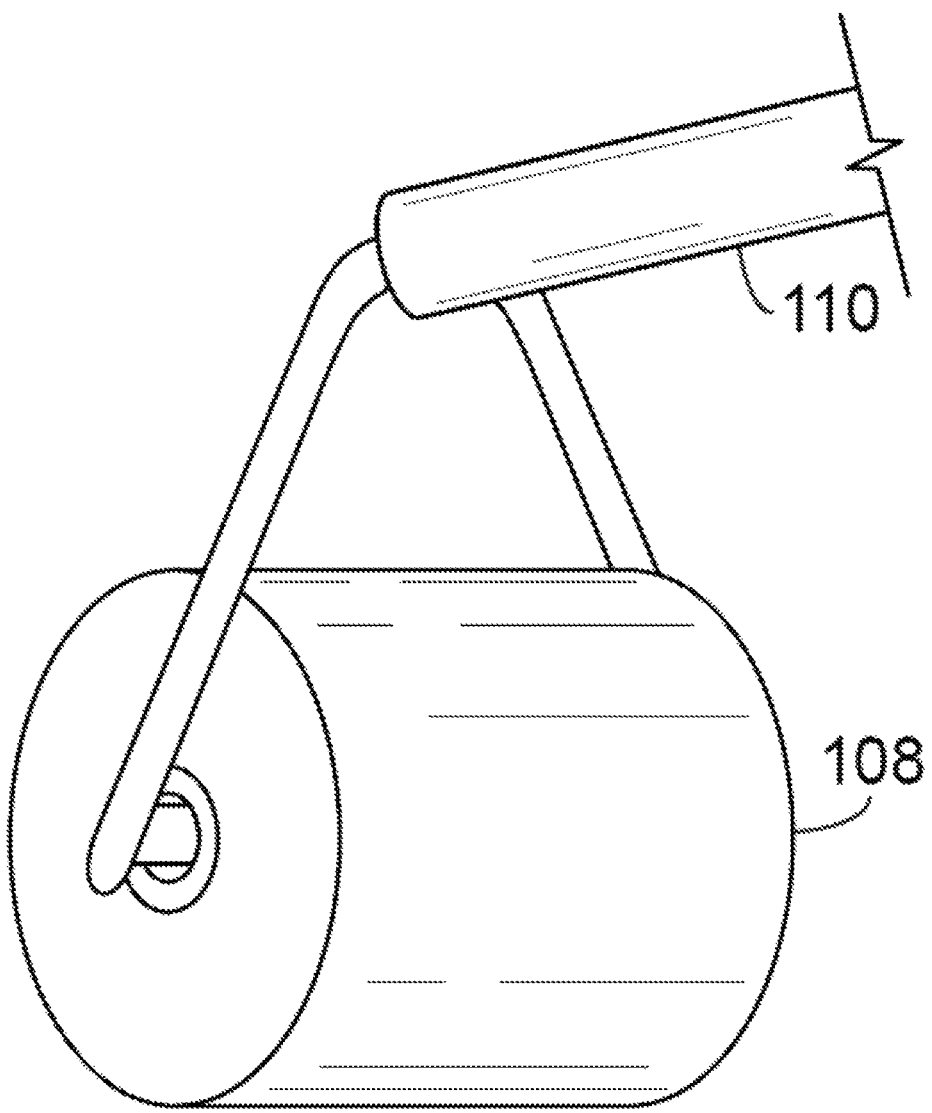
FIG. 5 illustrates a wheel of a somatosensory terminal feedback cane in accordance with various illustrative implementations.

In some implementations, each strut 110 can contain a suspension system. For example, the suspension system can be a spring suspension system. Each strut 110 can have its own suspension system such that each suspension system is an independent suspension system. In one implementation, the suspension system can be placed between the strut and the wheel. In another implementation, the suspension system can be attached to a distal portion of the strut that bears the axle of the respective wheel. FIG. 4 illustrates a spring suspension system of a strut in accordance with various illustrative implementations. A spring 402 accommodates the strut 110 to imperfections and minor obstacles on the immediate ground. The strut 110 can be connected to a wheel 108. FIG. 5 illustrates a wheel 108 of a somatosensory terminal feedback cane in accordance with various illustrative implementations. As an example of using a somatosensory terminal feedback cane, the cane can be placed approximately three feet ahead of the subject as he or she ambulates. As the cane moves over imperfections and obstacles, the imperfections and obstacles will be translated from the wheel to the strut to the pylon and to the handle in the hand of the subject navigating himself or herself forward. For example, as a leftmost wheel on its individual axle dips into a small area of depressed and uneven cement on an old sidewalk, the subject will feel the cane slightly dip into that recess and adjust accordingly, perhaps slightly altering his or her path toward the right.

As described above, a somatosensory terminal feedback cane can be in either an open or closed position. In one implementation, a user can maneuver a sliding cuff 302 to open and close the cane. In the closed position, the cane 100 can operate in a similar fashion as a traditional white cane.

FIG. 1B illustrates the somatosensory terminal feedback cane 100 in a closed position in accordance with various illustrative implementations. In the closed position, the cane 100 can be used to navigate in a crowded area. In one implementation, to further enhance the cane 100 in the closed position, the pylon 104 may be fitted with a small conventional white cane tip several inches below the distal end of the pylon 106. The white cane tip can then be used as a traditional white cane when the struts are retracted or flexed and closed.

The proximal portion of the pylon 106 may be attached to the handle/control system 104. The handle/control system 104 can be fit with a neoprene handle for comfort and for providing feedback from the six wheels 108. The handle/control system 102, the pylon 104, and the terminal feedback device 106 can be made of material such as, but not limited to, carbon fiber, aluminum, plastics, etc. In one implementation, the handle/control system 102 and/or the pylon 104 can include a recess that can receive an extension. For example, the extension can be another cane, an extension which increases the height of the cane, etc. The handle/control system 102 can also include a wrist loop. The wrist loop can keep the cane within reach of a subject, even if the subject loses his or hers grip on the cane.

Figures 6A, 6B:
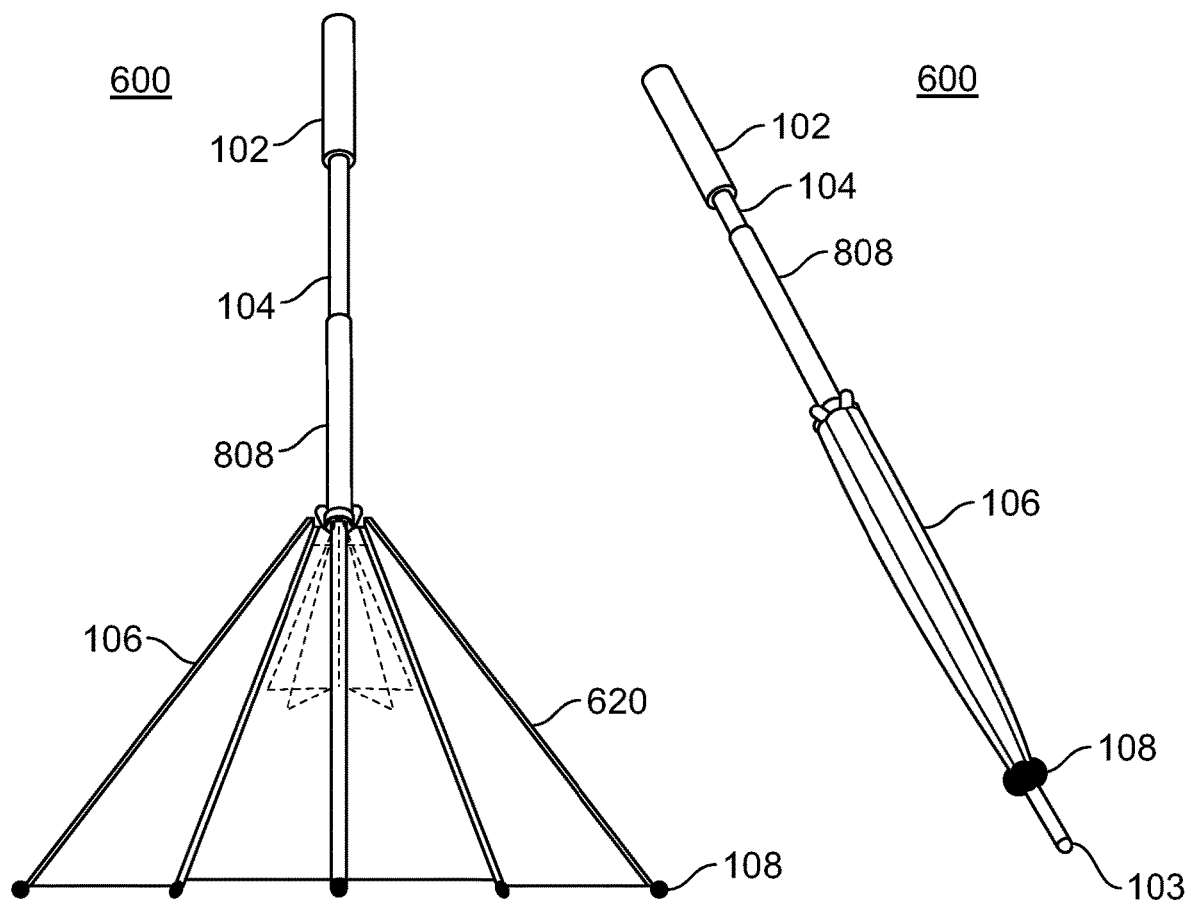

FIGS. 6A-6F illustrate a somatosensory terminal feedback cane in an open position in accordance with various illustrative implementations. FIGS. 6A and 6B illustrate the somatosensory terminal feedback cane 600 in an open and closed position, respectively. The somatosensory terminal feedback cane 600 includes a pylon 104 with a handle 102 and a terminal feedback device 106 with a retracting handle 808. The terminal feedback device 106 is slidable with respect to the pylon 104. In the illustrated implementation, the somatosensory terminal feedback cane 600 includes four satellite legs 602, as illustrated in FIG. 6C, which have wheels 108. The four satellite legs 602 increase the ground coverage compared to a traditional white cane and also enhances balance. In addition, the four satellite legs 602 can be used such that the swinging of the somatosensory terminal feedback cane 600 is not required. The four satellite legs 602 can have staggered lengths, as shown in FIG. 9D. For example, each leg can have a different length, pairs of legs can have different lengths, etc. The different lengths can improve edge detection. In another implementation, the somatosensory terminal feedback can have webbing 620 between the satellite legs as shown in FIG. 6E. The webbing 620 can shield a user from small obstacles and can increase the durability and/or stability of the four satellite legs 602. As described above, the somatosensory feedback terminal cane 600 be retractable, as shown in FIGS. 6B and 6F. When retracted the somatosensory feedback terminal cane is portable with the cane tip 103 extending beyond the wheels 620 and can also be used as a conventional cane.

Figure 7B:
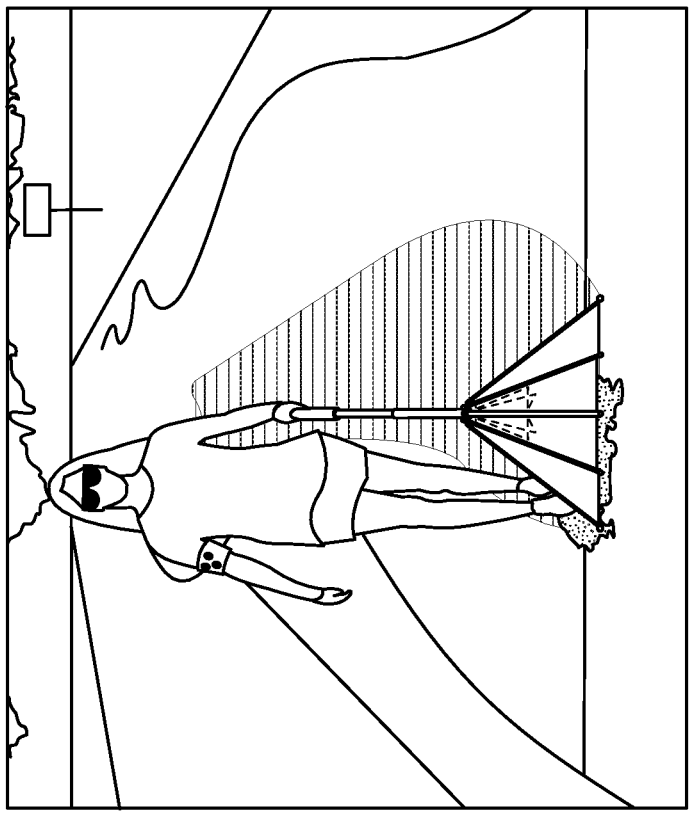
FIGS. 7A-7B illustrate a comparison between a standard cane and a somatosensory terminal feedback cane in accordance with various illustrative implementations.
Figure 7A:
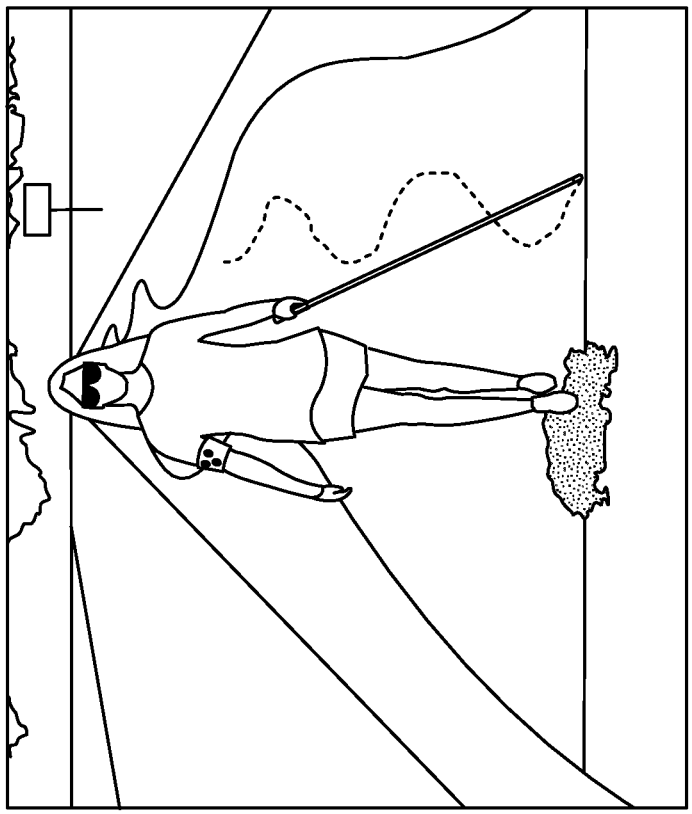

FIGS. 7A-7B illustrate a comparison between a standard cane and a somatosensory terminal feedback cane in accordance with various illustrative implementations. In FIG. 7A, the user is shown using a conventional white cane. If the white cane is not properly swung hazards can be missed. FIG. 7B illustrates the use of a somatosensory terminal feedback cane. As shown in FIG. 7B, the user is not required to swing the somatosensory terminal feedback cane back and forth as they walk while still identifying hazards.

Figure 8A:
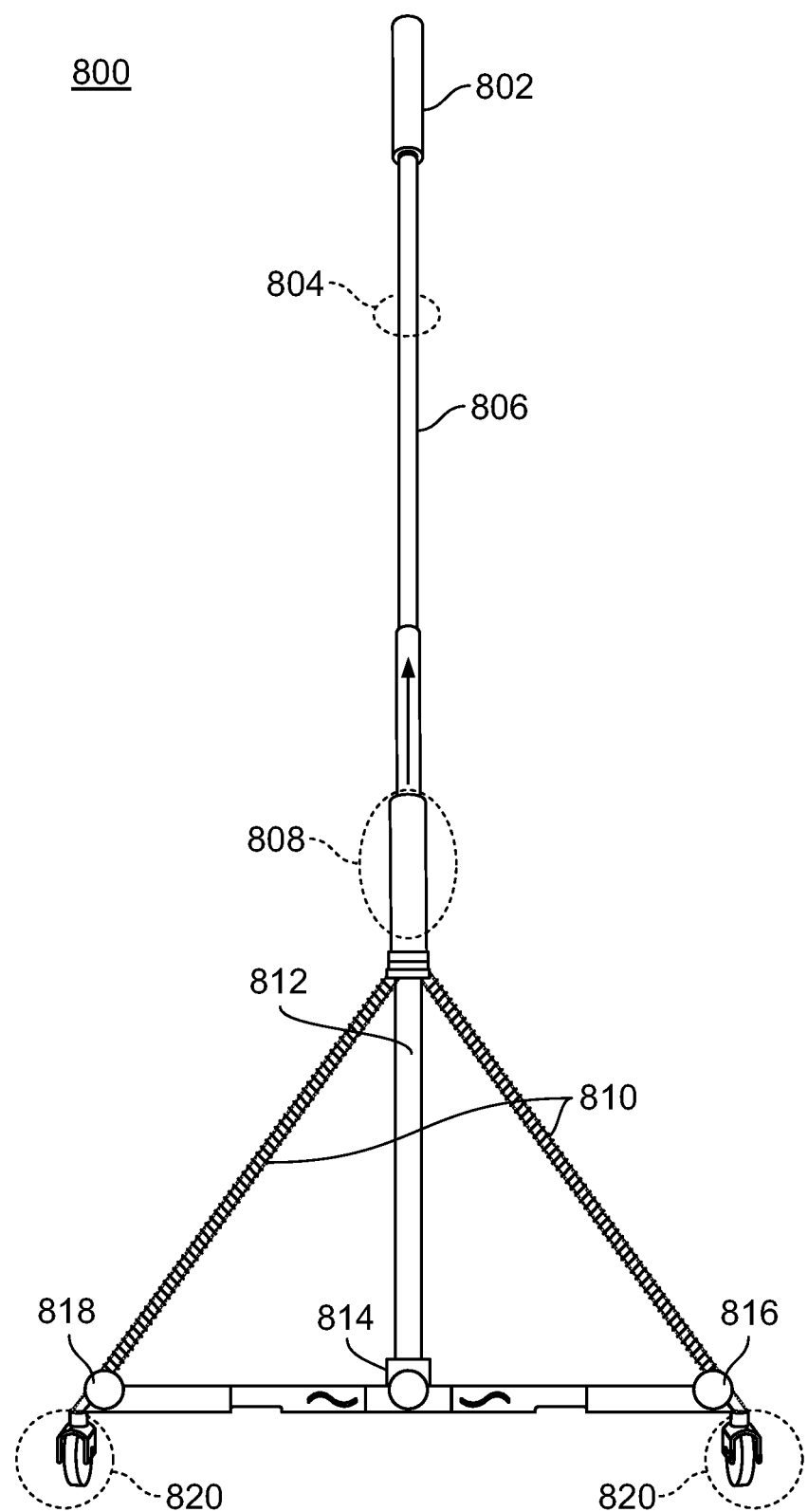
Figure 8B:
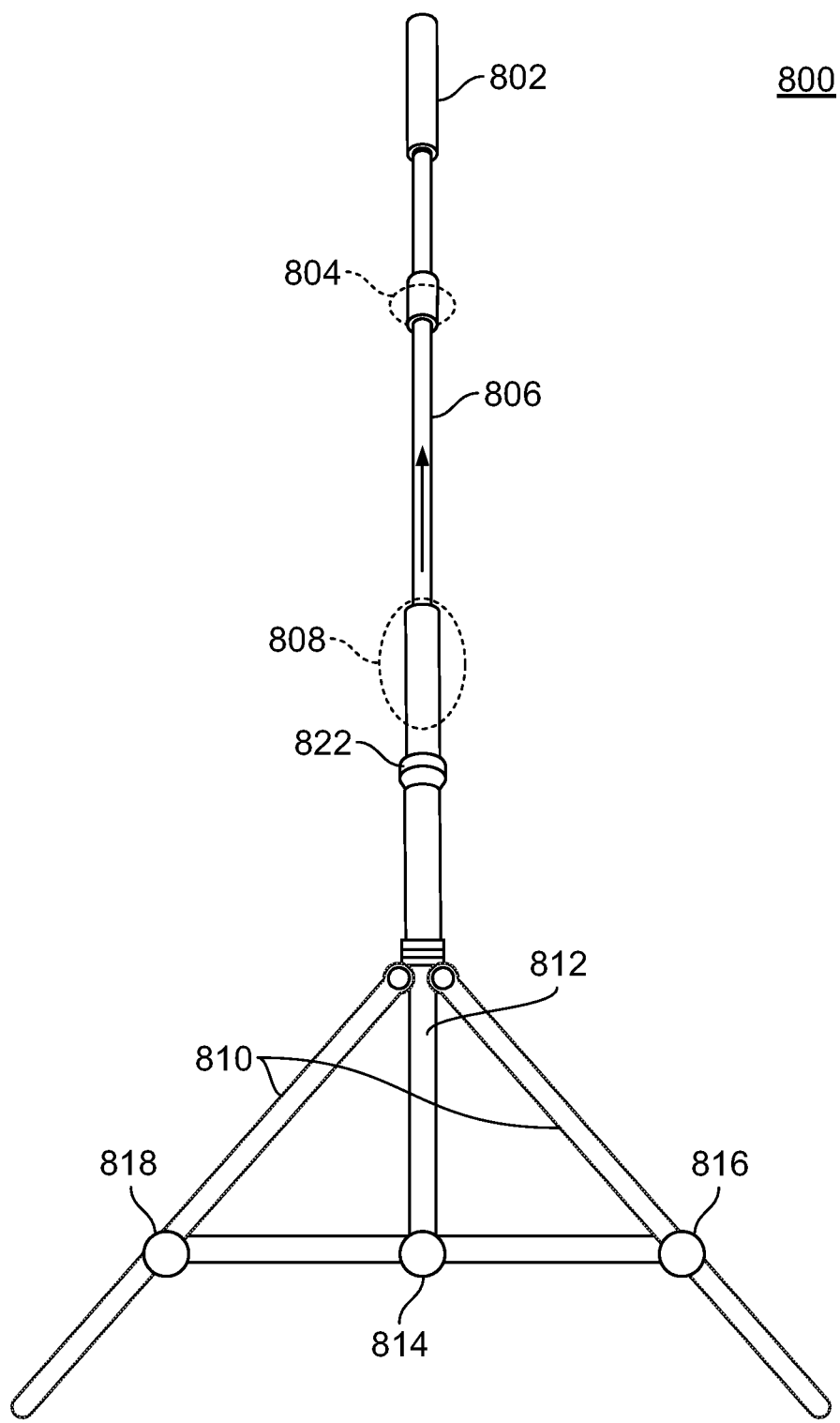
Figure 8H:
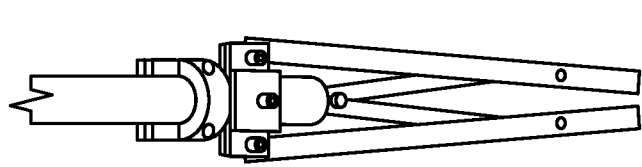
Figure 8G:
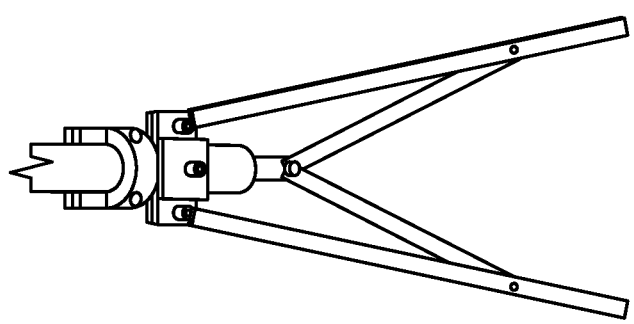
Figure 8F:
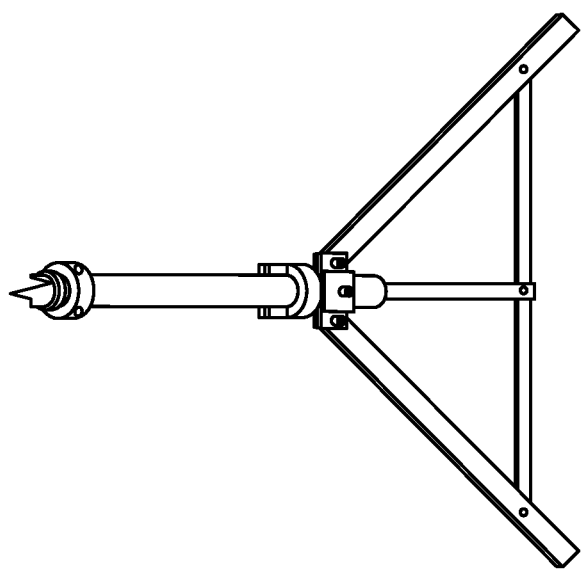

As described above, a somatosensory terminal feedback cane can have a plurality of wheels. In one implementation, a somatosensory terminal feedback cane has two wheels. FIGS. 8A-8H illustrate a two-wheel somatosensory terminal feedback cane in accordance with various illustrative implementations. FIG. 8A illustrates a schematic of a two-wheel somatosensory terminal feedback cane 800. FIG. 8B is a photograph of a prototype of a two-wheel somatosensory terminal feedback cane 800. The cane 800 includes a handle 802 connected to a pylon 806. A sliding retractor handle 808 can move along the axes of the pylon 806 to open and close the cane 800. The sliding retractor handle 808 can be moved to a closed position where the sliding retractor handle 808 can be locked in the closed position via a top lock 804. There is also a corresponding locking position 822 (shown in FIG. 8B) that is used to lock the sliding retractor handle 808 into the open position. Two legs 810 and a retracting strut 812 are connected to the sliding retractor handle 808. When moved from the open to the closed position, the sliding retractor handle 808 causes the retracting strut 812 to move along the axes of the pylon 806. In one implementation, the pylon 806 is hollow and a portion of the retracting strut 812 moves into the hollow portion of the pylon 806 when the cane is closed. The legs 810 can move toward the axes of the pylon based upon hinged joints 814, 816, and 818. Each hinged joint can have a hinge or other hinging mechanism. FIGS. 8C-8H illustrate the open, closing/opening, and closed positions. The cane 800 also includes two wheels 820. As described in greater detail below in regard to FIGS. 10A-10B, the wheels 820 can also have an open and closed position.

Figure 9A:
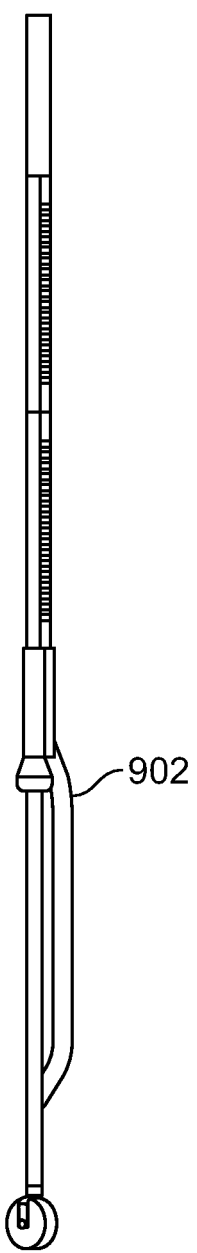
FIGS. 9A-9B illustrate a somatosensory terminal feedback cane with a retracting shaft in accordance with various illustrative implementations.
Figure 9B:
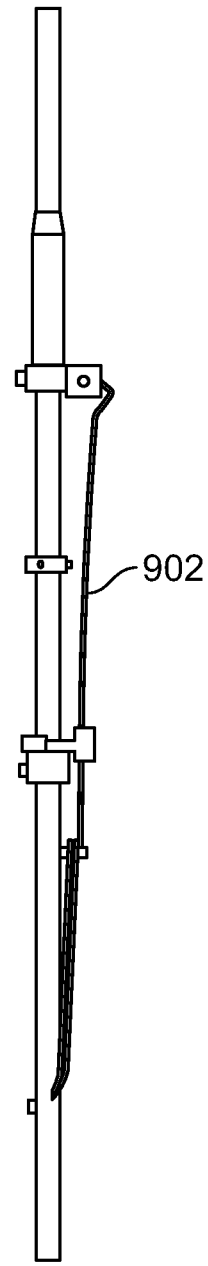

FIGS. 9A-9B illustrate a somatosensory terminal feedback cane with a retracting shaft in accordance with various illustrative implementations. FIG. 9A is a schematic and FIG. 9B is a photograph of a prototype of a somatosensory terminal feedback cane with a retracting shaft. The retracting shaft 920 can join the retractor handle and the central joint.

Figure 10B:
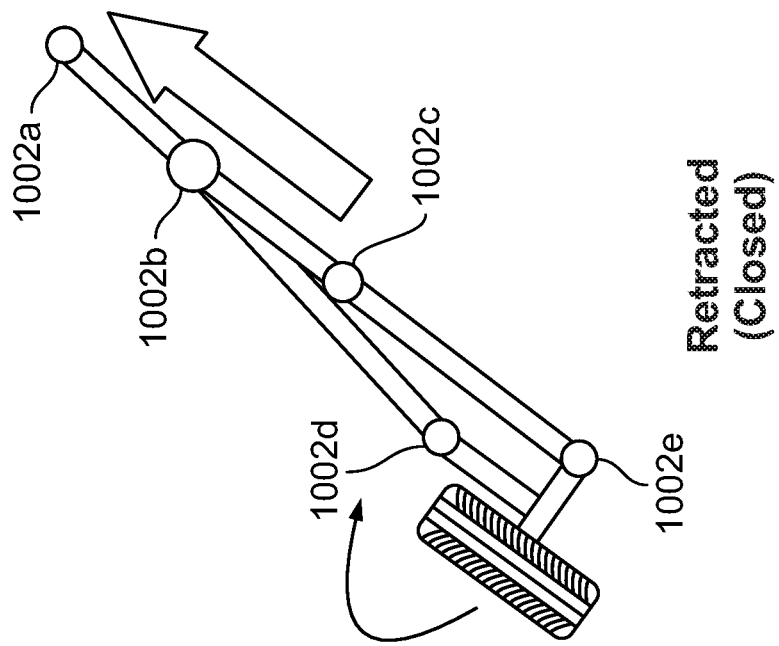
FIGS. 10A-10B illustrate a wheel of a somatosensory terminal feedback cane in accordance with various illustrative implementations.
Figure 10A:
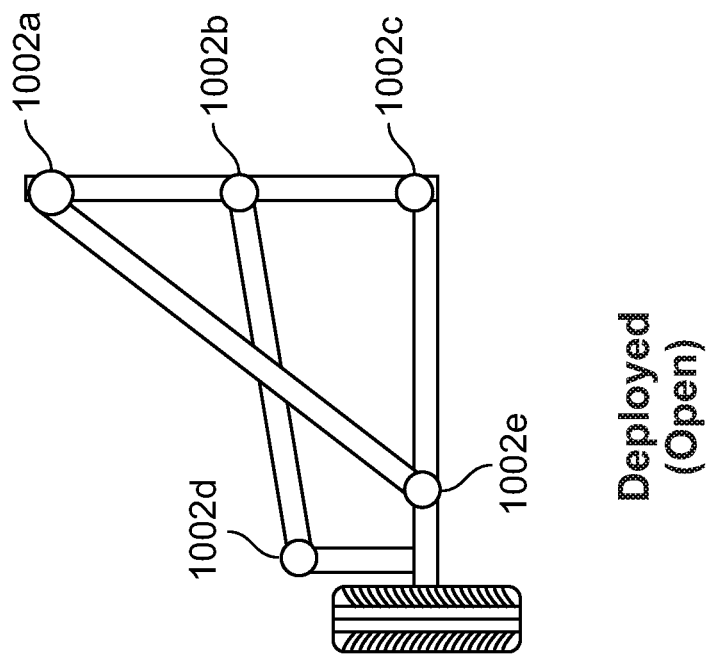

FIGS. 10A-10B illustrate a wheel of a somatosensory terminal feedback cane in accordance with various illustrative implementations. FIG. 10A illustrates the wheel when the somatosensory terminal feedback cane is in the open position. FIG. 10B illustrates the wheel when the somatosensory terminal feedback cane is in the closed position. In this embodiment, a subretractor system includes multiple hinges 1002a-1002e that are operably connected to the sliding retractor handle. The subretractor system controls the position of the wheels in the open and closed position of the somatosensory terminal feedback cane. In one implementation, the wheels in the closed position are positioned to maximize utility of the somatosensory terminal feedback cane.

Figure 11:
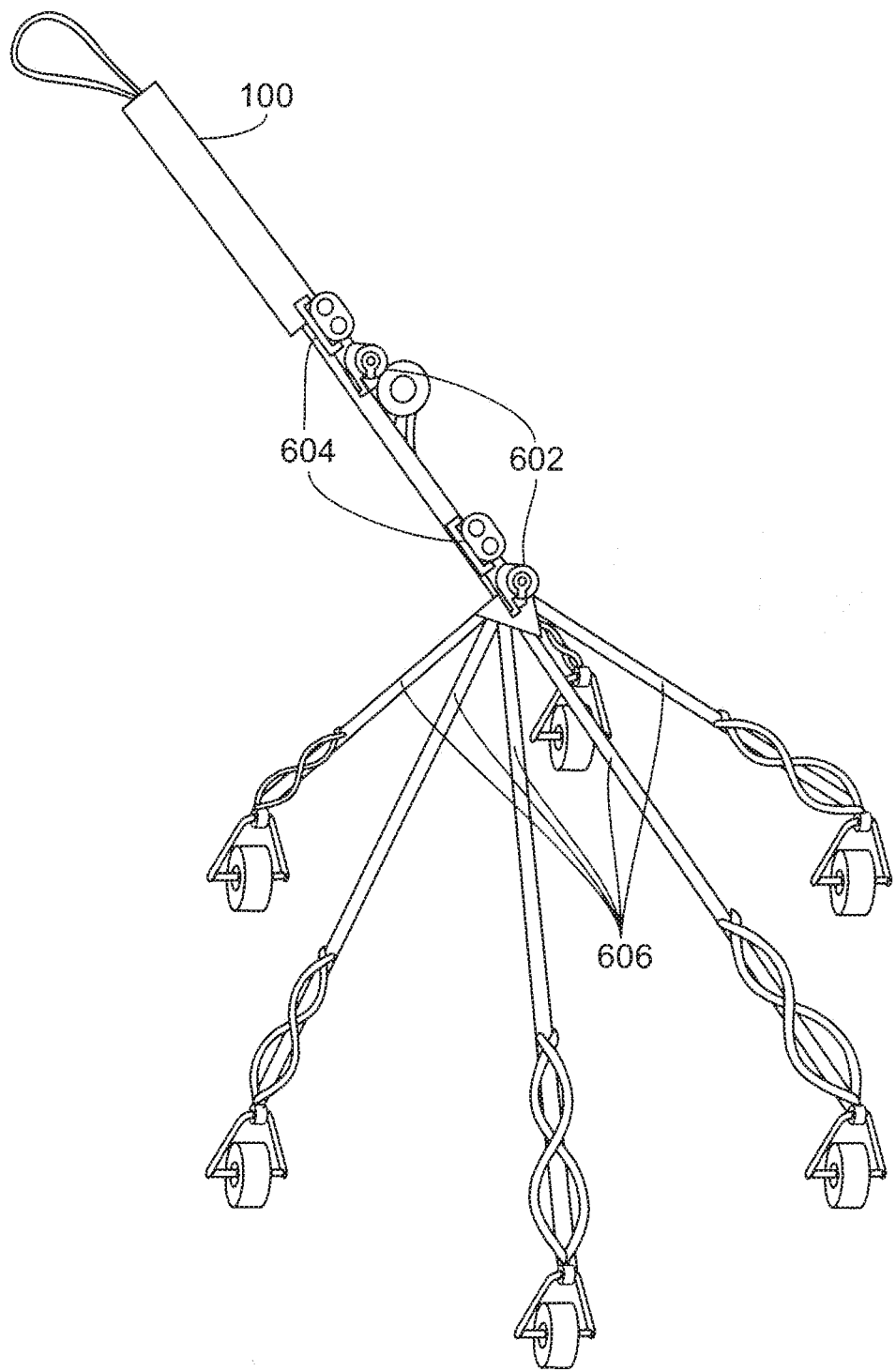
FIG. 11 illustrates a somatosensory terminal feedback cane with integrated sensors in an open position in accordance with various illustrative implementations.

In another implementation, a somatosensory terminal feedback cane 100 can include various sensors that actively monitor an environment. FIG. 11 illustrates a somatosensory terminal feedback cane with integrated sensors in an open position in accordance with various illustrative implementations. Various sensors can be affixed to the somatosensory terminal feedback cane 100. For example, ultrasound sensors 1106, infrared sensors 1102, and Light Detection and ranging (LIDAR) sensors can be integrated into the somatosensory terminal feedback cane 100. Various combinations of the sensors can be used. For example, only one type of sensor can be used. In other implementations, two or three types of sensors can be integrated into the cane 1100. Using all three types of sensors allows the capturing of different feature sets of the surrounding environment. In one implementation, the sensors can be affixed to the pylon 104 and/or terminal feedback arms 1106 of the cane 1100. In one implementation, each sensor emits radiation, sound, etc. and the same sensor detects the reflection of the radiation, sound, etc. This allows the sensors or the collection of data from the sensors to determine the distance and/or size of obstacles in the environment. In addition, the data from the sensors can be used to construct a three dimensional representation of a user's ambient environment.

Figure 12:
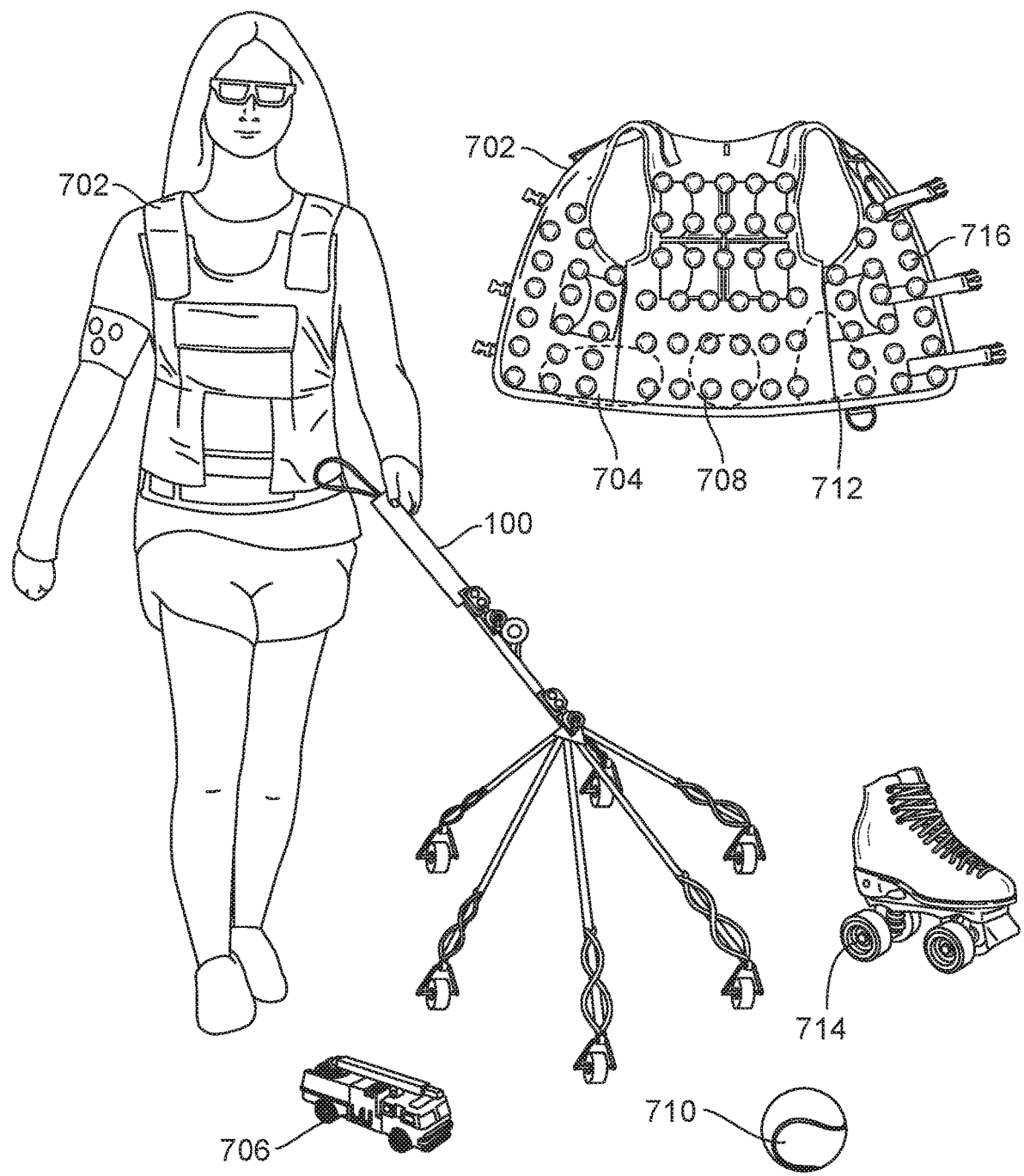
FIG. 12 illustrates projection of obstacles via a vest in accordance with various illustrative implementations.

The data from the one or more sensors can be transmitted to a computer processing unit in a piece of clothing, such as a vest, worn by a user of the cane 100. FIG. 12 illustrates projection of obstacles via a vest 1202 in accordance with various illustrative implementations. The vest 1202 can include an array of actuators 1216. The information received from the sensors can be converted from a three dimensional imprint to a two dimensional representation of the environment. The actuators 1216 can be electroactive polymers (EAPs) and can be configured to correspond with the two-dimensional topographical surface of the user's environment. The actuators are controlled by the computer processing unit (not shown) and can move to provide the user a tactile representation of the environment. For example, the computer processing unit can control the actuators 1216 based upon the two dimensional representation of the environment to provide an indication of the various obstacles in the environment. Thus, the three dimensional environment representation is mapped out on the interior of the vest 1202 using the actuators. For example, a truck 1206 located to the bottom right of the user's path, a ball 1210 located in the center of the user's path, and a roller skate 1214 located to the bottom left of the user's path can be obstacles in the path of the user. Using the various integrated sensors on the cane 100, the various obstacles can be detected. To provide an indication of these obstacles, the actuators can be controlled to provide a tactile input to the user. For example, the truck can be represented by a group of actuators 1204. The group of actuators 704 being on the lower right side of the vest indicates to the user that there is an obstacle on the lower right of the user's path. In addition, the number of actuators used provides an indication of the size of the obstacle. Similar groups of actuators can be controlled based upon detection of the ball 1210, group 1208, and detection of the roller skate 1214, group 1212. In addition to providing an indication of an obstacle, the system can provide the user with an indication of how an obstacle moves. For example, if the ball 1210 was bouncing toward the user, the actuators that represented the ball would move up and down the vest as the ball moved. The user can, therefore, not only sense obstacles but also sense how the obstacles are moving.

Figure 13A:
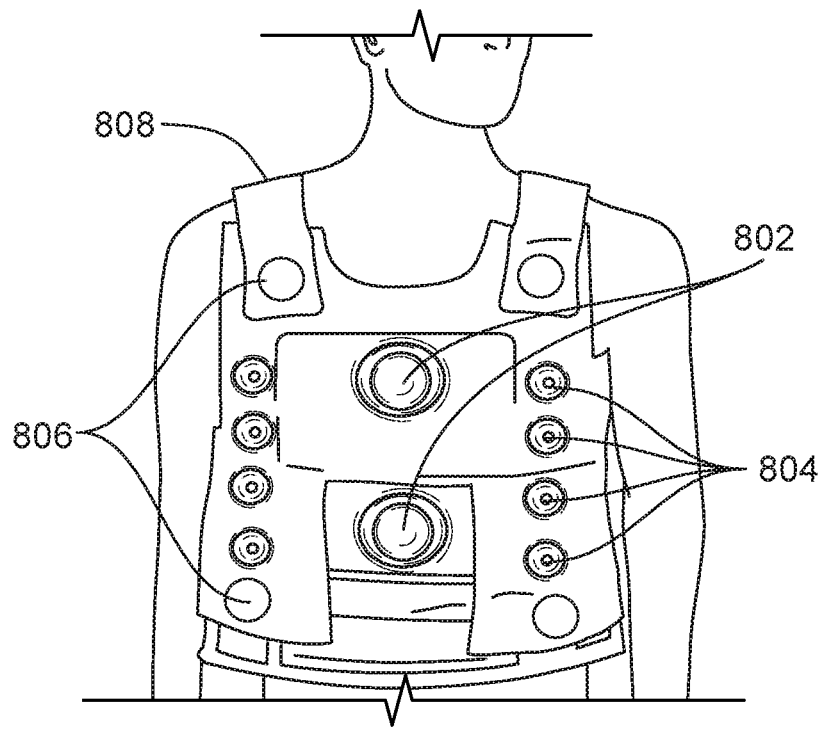
FIGS. 13A and 13B illustrate a somatosensory terminal feedback vest with integrated sensors in accordance with various illustrative implementations.
Figure 13B:
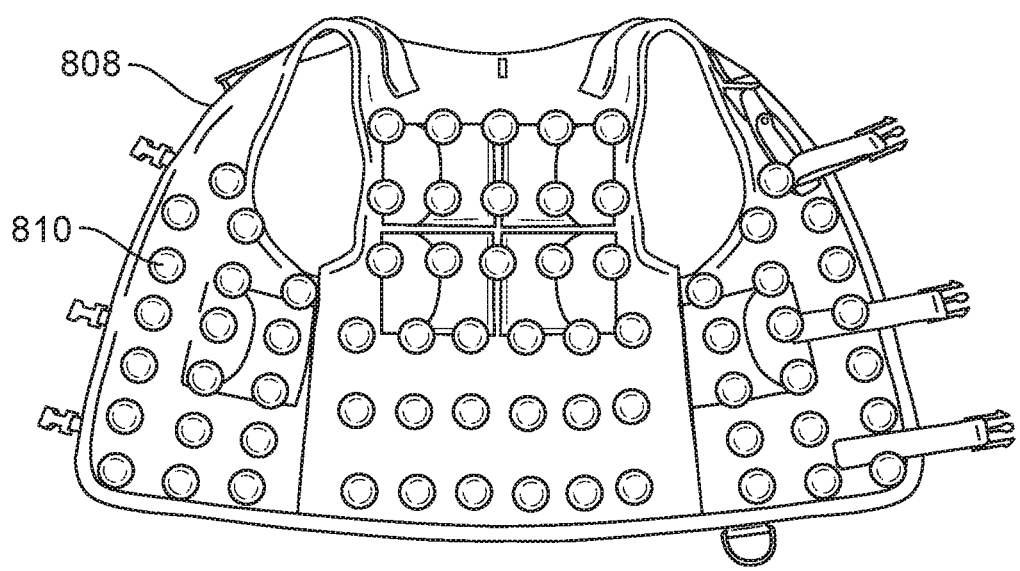
Figure 14:
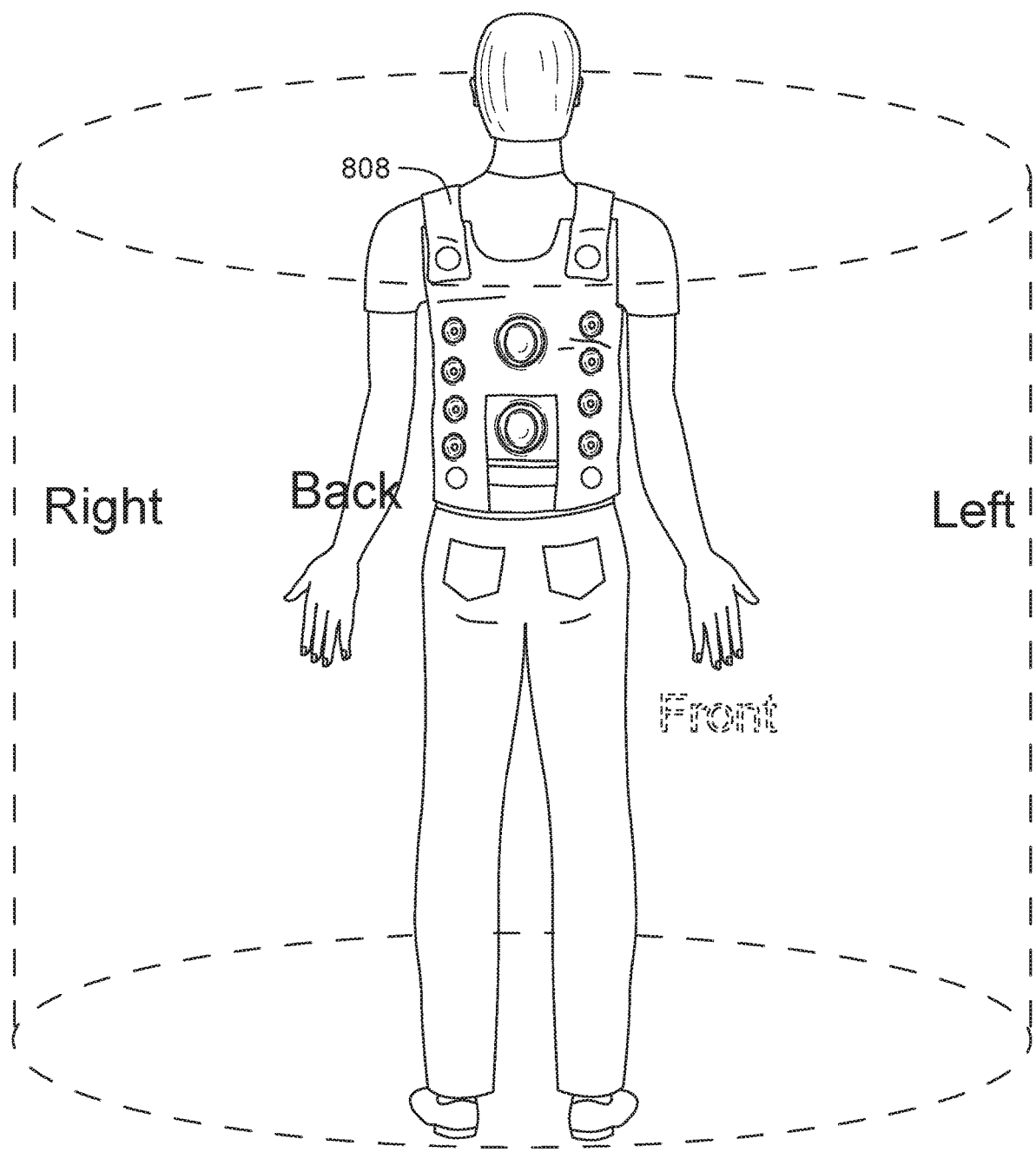
FIG. 14 illustrates an environment around a somatosensory terminal feedback vest with integrated sensors in accordance with various illustrative implementations.

In another implementation, the various sensors can be integrated into the vest or other piece of clothing. This allows a user to wear the vest without the need of a cane. FIGS. 13A and 13B illustrate a somatosensory terminal feedback vest 1308 with integrated sensors in accordance with various illustrative implementations. Similar to the cane 100 that include various sensors, the vest 1308 can include ultrasound sensors 1306, infrared sensors 1304, and/or LIDAR sensors 1302. These sensors allow data to be collected in a visually degraded environment. For example, the vest 808 can be used in an environment filled that is smoke or has no light. The vest 808 includes sensors on both the front and back. In addition, sensors can be integrated into the sides of the vest 1308. Accordingly, this allows data from the various sensors to construct a 360 degree view of the environment and allows the detection of obstacles from around the user, as illustrated in FIG. 14.

Figure 15:
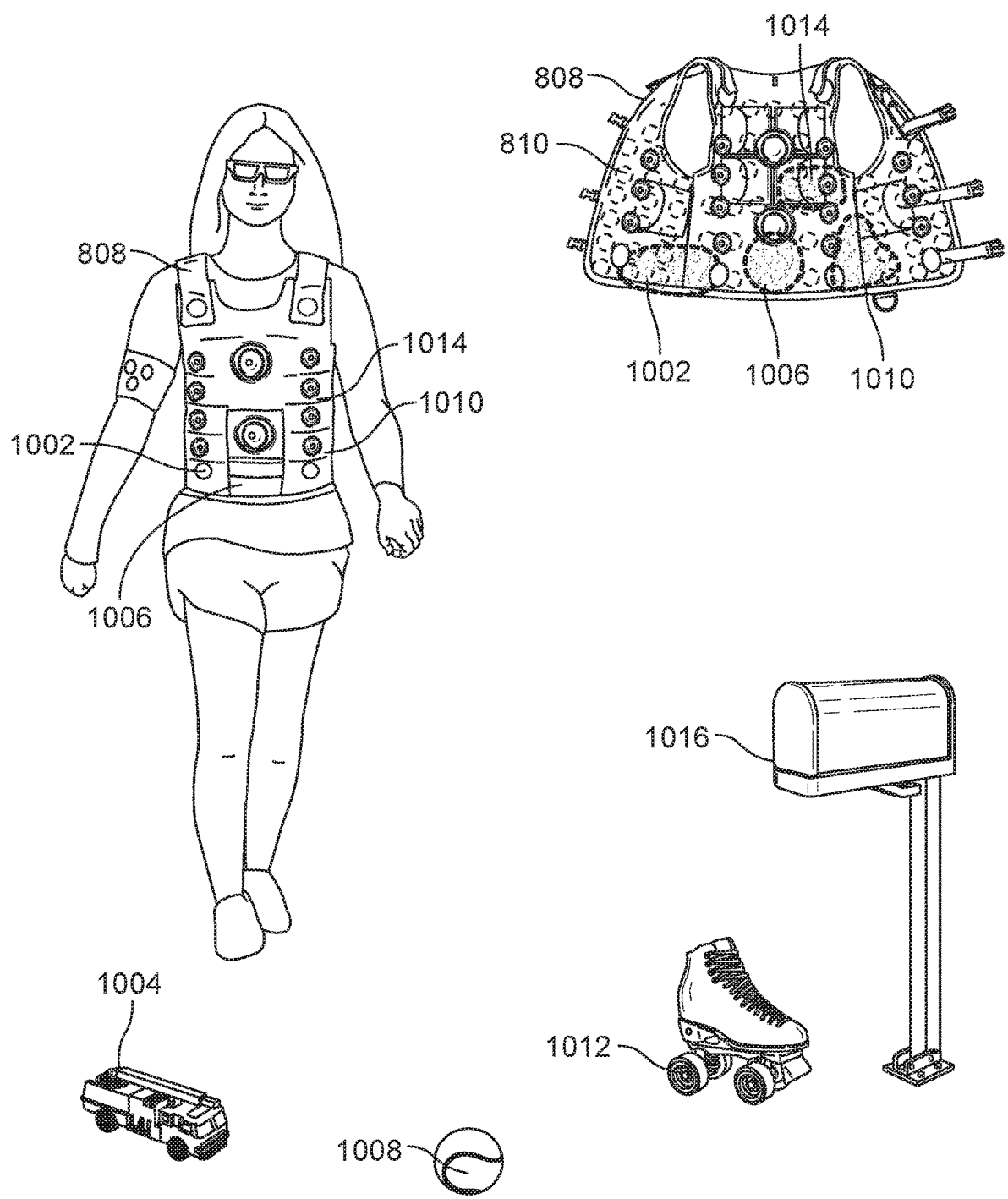
FIG. 15 illustrates obstacles in an environment around a somatosensory terminal feedback vest with integrated sensors in accordance with various illustrative implementations.

The data from the one or more sensors can be transmitted to a computer processing unit in the vest 808. FIG. 15 illustrates obstacles an environment around a somatosensory terminal feedback vest with integrated sensors in accordance with various illustrative implementations. The integrated sensors can include one or more of ultrasound sensors, infrared sensors, other forms of radio-frequency-based communication and detection systems, visible and infrared (thermal) camera-based sensors, light detection sensors, and Light Detection and ranging (LIDAR) sensors. The vest 1308 includes an array of actuators 1310, such as EAPs as described above. The actuators 1310 are used to provide a tactile representation to the user of the surrounding environment. The information received from the sensors can be converted from a three dimensional imprint to a two dimensional representation of the environment. The actuators 1310 can be configured to correspond with the two-dimensional topographical surface of the user's environment. The actuators are controlled by the computer processing unit (not shown) and can move to provide the user a tactile representation of the environment. For example, the computer processing unit can control the actuators 1310 based upon the two dimensional representation of the environment to provide an indication of the various obstacles in the environment. Thus, the three dimensional environment representation is mapped to the interior of the vest 1308 using the actuators. For example, a truck 1504 located to the bottom right of the user's path, a ball 1508 located in the center of the user's path, a roller skate 1512 located to the bottom left of the user's path, and a mailbox 1506 located in the middle left of the user's path can all be obstacles in the path of the user. Using the various integrated sensors integrated into the vest, the various obstacles can be detected. To provide an indication of these obstacles, the actuators 1310 can be controlled to provide a tactile input to the user. For example, the truck can be represented by a group of actuators 1502. The group of actuators 1502 being on the front lower right side of the vest indicates to the user that there is an obstacle on the lower right of the user's path. In addition, the number of actuators used provides an indication of the size of the obstacle. Similar groups of actuators can be controlled based upon detection of the ball 1508, group 1506, detection of the roller skate 1512, group 1510, and the mailbox 1516, group 1514. In addition to providing an indication of an obstacle, the system can provide the user with an indication of how an obstacle moves. For example, if the ball 1508 was bouncing toward the user, the actuators that represented the ball would move up and down the vest as the ball moved. The user can, therefore, not only sense obstacles but also sense how the obstacles are moving. In various implementations, the vibration and/or pressure produced by the actuators will be specifically matched to the maximum sensitivity of the skin to detect environmental vibrations and pressure.

Figure 16:
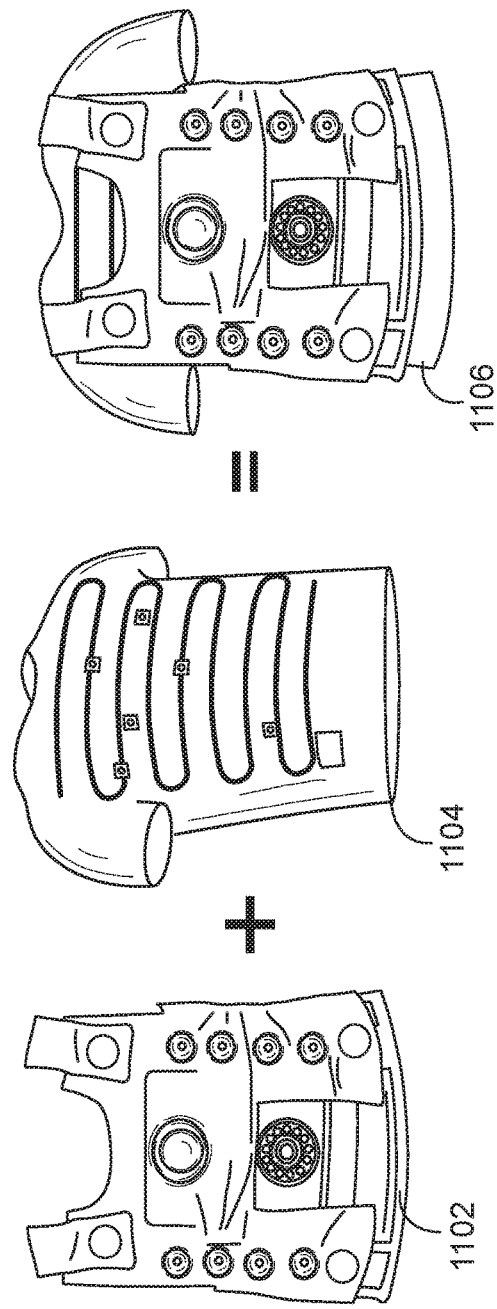
FIG. 16 illustrates two layers of a somatosensory terminal feedback vest with integrated sensors in accordance with various illustrative implementations.

In various implementations, the vest 1308 can be made of two different layers. FIG. 16 illustrates two layers of a somatosensory terminal feedback vest with integrated sensors in accordance with various illustrative implementations. An exterior layer 1602 can include the various sensors that are used to map the environment of a user. These sensors can be integrated with actuators that are located on or within an interior layer 1604. The actuators can form a vibrating interface that provides a tactile input to a user that corresponds with their environment. In one implementation, the actuators provide a sense of pressure and/or vibration to the user by using electrically conducting polymers (ECPs) or other small motors as described herein. These two layers 1602 and 1604 can be integrated into various wearable articles, such as a vest 1606.

Figure 17:
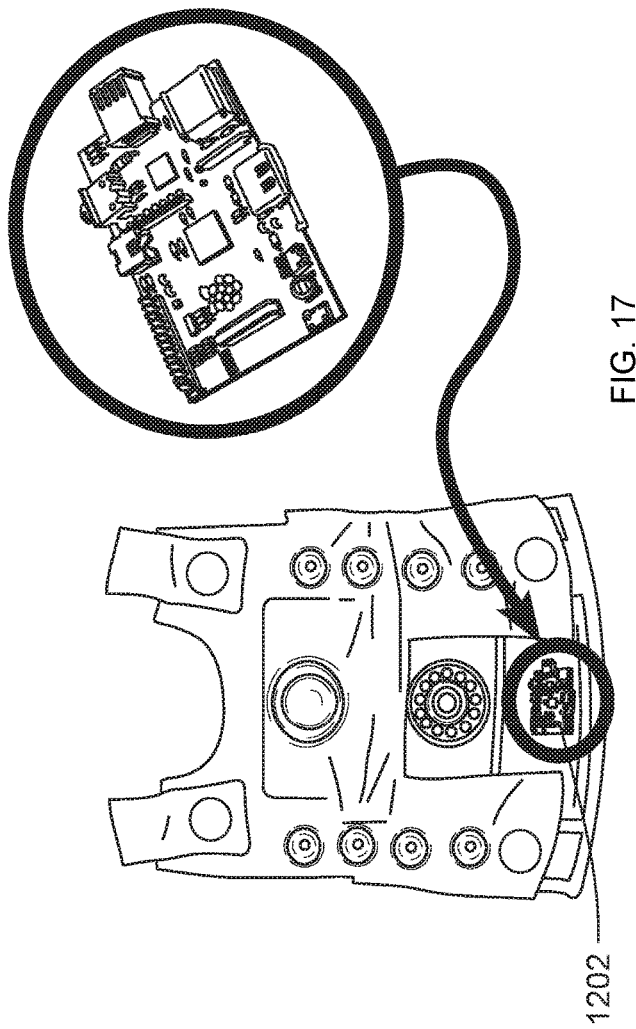
FIG. 17 illustrates a controller for a somatosensory terminal feedback vest with integrated sensors in accordance with various illustrative implementations.

A controller can be used to activate actuators, e.g., vibrating motors, ECPs, etc., based upon data from the sensors. FIG. 17 illustrates a controller 1702 for a somatosensory terminal feedback vest with integrated sensors in accordance with various illustrative implementations. In the illustrated implementation, the controller 1702 can be integrated directory into the wearable article. The controller can also process the data from the sensors to determine which actuators to activate. In other implementations, the data from the sensors can be transmitted to an external device, such as, but not limited to, a smartphone, a laptop, or other computing system. This external device can process the sensor data and determine which actuators to activate based upon sensor data, e.g., based upon detected obstacles from the sensor data. Data representing the actuators to activate can then be transmitted back to the controller that activates the actuators based upon the received data.

Figure 18:
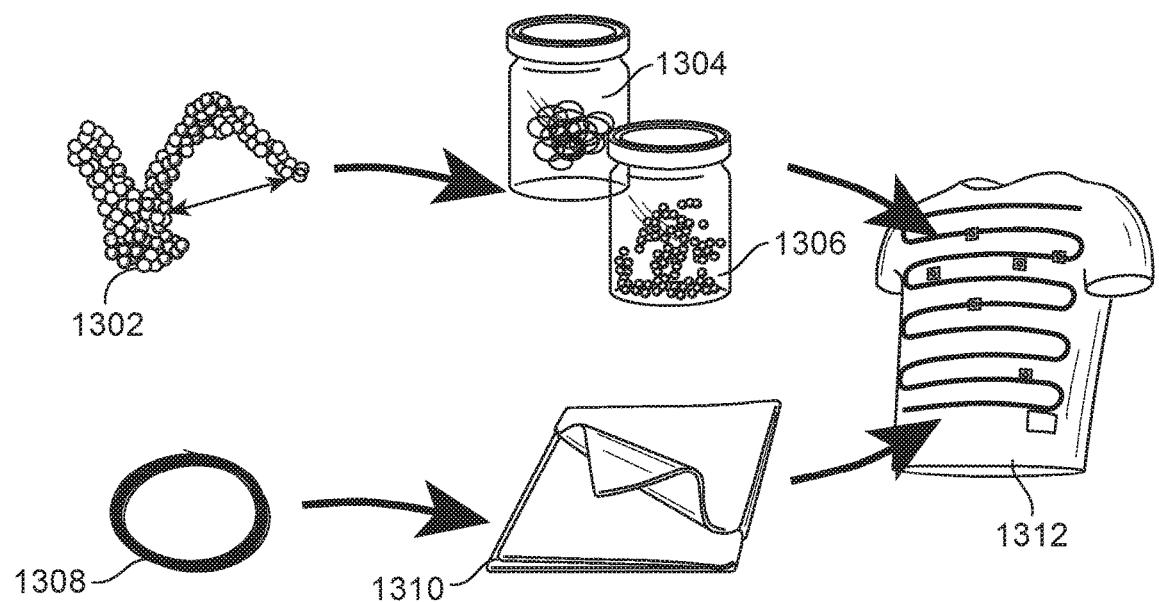
FIG. 18 illustrates materials used to make an interior layer for a somatosensory terminal feedback vest with integrated sensors in accordance with various illustrative implementations.

FIG. 18 illustrates materials used to make an interior layer for a somatosensory terminal feedback vest with integrated sensors in accordance with various illustrative implementations. A vibrating interface 1812 includes actuators that are used to transmit spatial information used for spatial orientation and navigation, e.g., spatial obstacle information, via tactile stimulation using the vibrating interface 1812. In one implementation, the vibrating interface 1812 includes a textile that includes embedded electroactive polymers (EAPs) 1802 capable of deforming upon electrical stimulation. EAPs 1802 are electrically driven, very lightweight, durable compounds that can be combined to form unique elastomers. Examples of these elastomers include conducting polymer strands 1804 and conducting polymer spheres 1806. These elastomers 1804 and 1806 have the ability to expand to ten times their native size.

Controllable actuation stimulated by an electric field, that can mimic muscle twitch, can be developed using electrically conducting polymers. Examples of ECPs include the conducting polymer strands 1804 and the conducting polymer spheres 1806. In certain implementations, ECPs perform in superior manner compared with piezoelectric, ionic or metal-containing polymer composites. However, in certain implementations, piezoelectric or ionic or metal-containing polymer composites are utilized to provide the feedback described herein. An obtainable stress of 5 millipascal (mPa) with an ECP can result in 5-600 millinewton (mN) force when a voltage of −1V is applied to cause the actuating motion. Such force is adequate for the required sensitivity on the haptic interface. The actuator can be built using ECPs like polyaniline or polypyrrole in a doped state enforced with carbon nanowires with an elastomeric substrate to provide the required mechanical performance.

Figure 19:
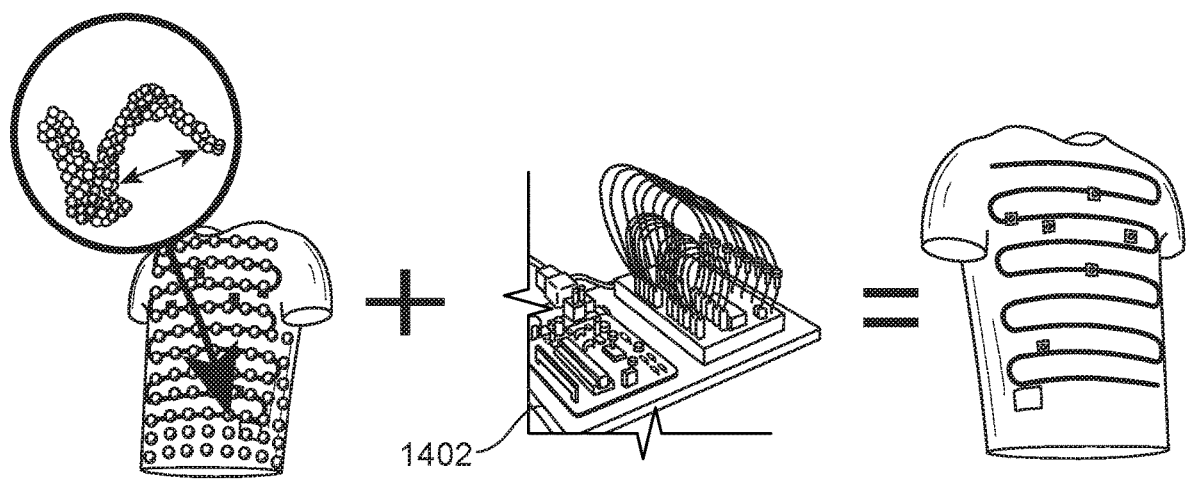
FIG. 19 illustrates an interior layer with a controller for a somatosensory terminal feedback vest with integrated sensors in accordance with various illustrative implementations.

FIG. 18 illustrates one implementation using these various pieces together to form the vibrating interface 1812. The EAPs 1802 can be used to create conducting polymer strands 1804 and conducting polymer spheres 1806. The polymer strands 1804 and/or conducting polymer spheres 1806 can be integrated into a conductive fabric 1310. The fabric 1810 can be made from conductive thread 1808. The conductive fabric 1810 can be integrated with one or more ECPs. In one implementation, multiple pieces of conductive fabric can be integrated together to create the vibrating interface 1812. Each piece of conductive fabric can be controlled by the controller (not shown in FIG. 18). Accordingly, each portion of the vibrating interface 1812 can be individually controlled. A controller 1902 is illustrated in FIG. 19, which illustrates an interior layer with the controller 1902 for a somatosensory terminal feedback vest with integrated sensors in accordance with various illustrative implementations.

As described above, a wearable external sensor module can incorporate multiple ranging and imaging sensors (ultrasound, infrared, etc.) into a single spatial orientation module.

Figure 20:
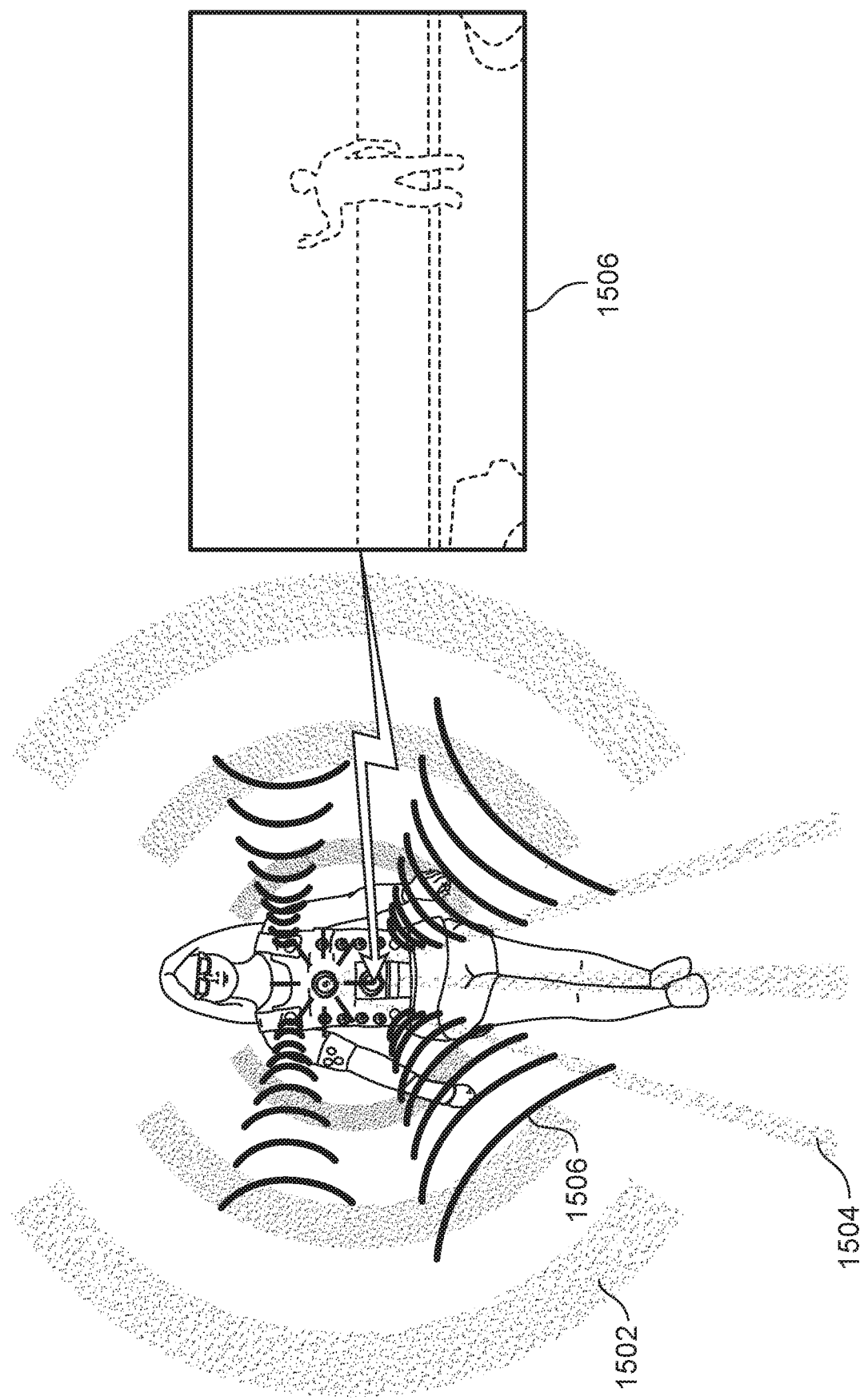
FIG. 20 illustrates use of integrated sensors within a somatosensory terminal feedback vest in accordance with various illustrative implementations.
Figure 21A:
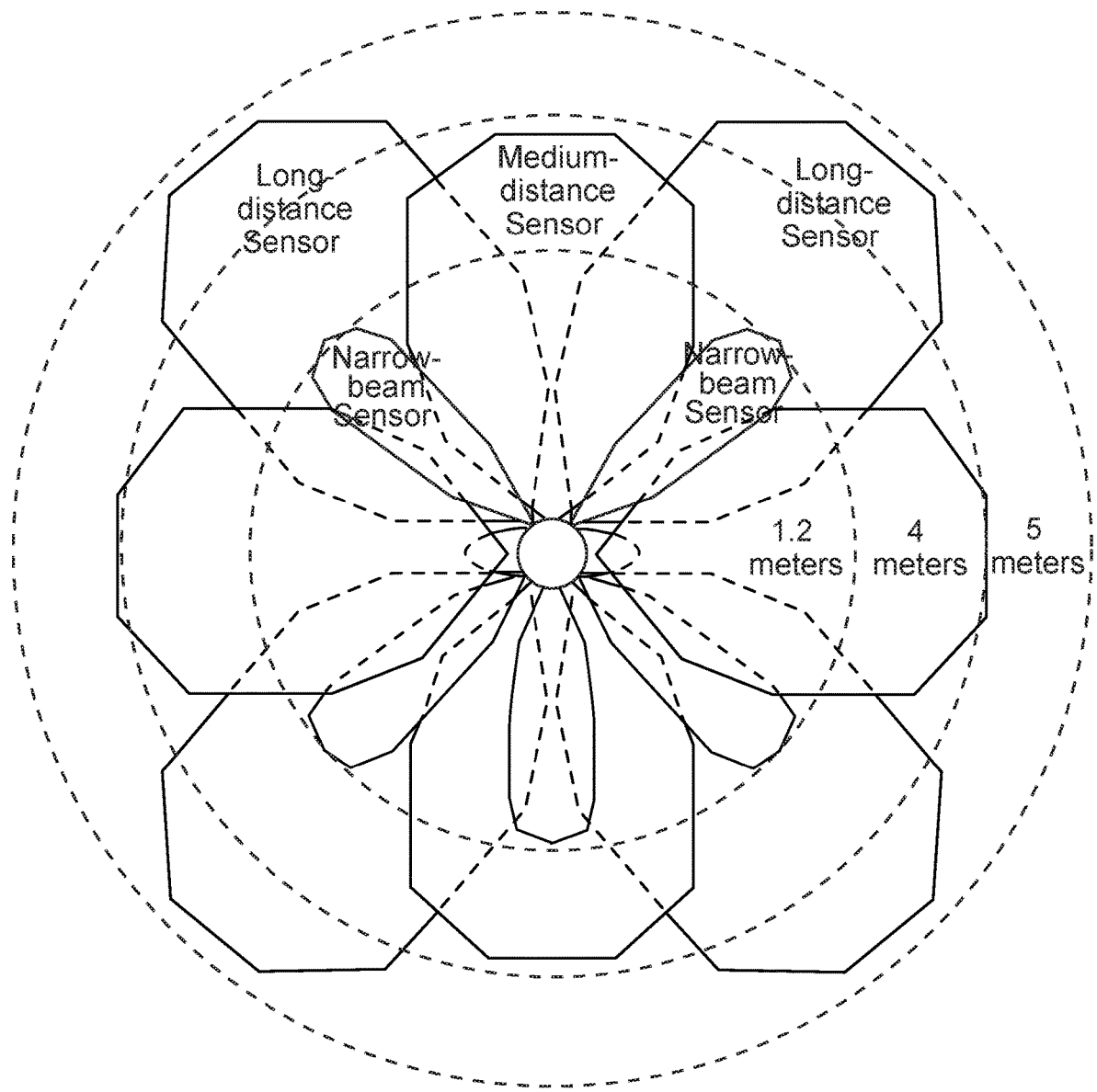
FIG. 21A illustrates ranges of various integrated sensors within a somatosensory terminal feedback device in accordance with various illustrative implementations.

The data from the outputs of multiple sensors can use Bayesian integration of multiple inputs of the sensors, similar to the types of computations used by the central nervous system, to generate perceptions based on multisensory inputs. For example, a tactile code, e.g., information regarding location of obstacles near a person, can be used to control the actuators to provide the tactile input to the person. FIG. 20 illustrates use of integrated sensors within a somatosensory terminal feedback vest in accordance with various illustrative implementations. Different types of sensors can use different ways of collecting sensory data. For example, ultrasound 2006, infrared 2004, and radiofrequency 2002 can be used by sensors to collect environmental data that can be processed to identify objects near a user, such as a person 2006. FIG. 21A illustrates ranges of various integrated sensors within a somatosensory terminal feedback device in accordance with various illustrative implementations. Long-distance sensors can have a wide angle to allow for detecting environmental data at long distances. The combination of long-, medium-, and narrow cones can be used to generate environmental information that can be used to localize objects within the environment of a user. Using the environmental information from the sensors, obstacles within the environment can be detected. The location of the obstacle can be communicated to a user via the touch sensation of the user via the actuators. Further examples of using a somatosensory terminal feedback item includes indicating the presence of a doorway, indicating which of two or more objects is closer to the user, indicating the location of an object relative to a moving user, etc. Further, incorporation of multiple sensors situated around a user can provide object detection surrounding the user.

Figure 21B:
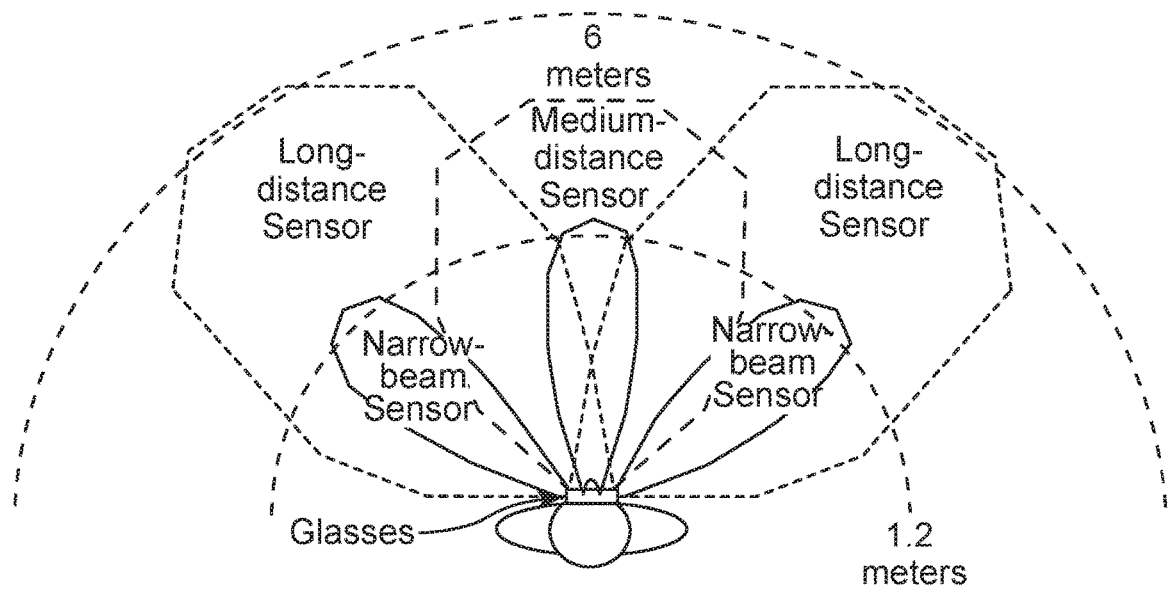
FIG. 21B illustrates ranges of various integrated sensors integrated in eyeglasses within a somatosensory terminal feedback device in accordance with various illustrative implementations.

In another implementation, one or more ultrasonic ranging sensors can be used. For example, this sensor can be integrated into frames of glasses. FIG. 21B illustrates ranges of various integrated sensors integrated in eyeglasses within a somatosensory terminal feedback device in accordance with various illustrative implementations. The implementation illustrated in FIG. 21B provides head-relative obstacle information and hence enables psychophysical experiments using the tactile EAP module. A single-sensor implementation relies on head movement to control which part of near space is to be examined. Further, the level of signal processing necessary to support obstacle perception and basic navigation can be determined based upon this implementation. Raw sensors output can be directly provided to the actuators, e.g., simply twitch the fiber whenever a ping from the ultrasonic ranging module is received. The results of basic localization and navigation experiments using this and several additional levels of signal processing, including a Bayesian inference algorithm designed to determine distance, can be used to convey this information as a frequency code to the actuators.

Figure 22A:
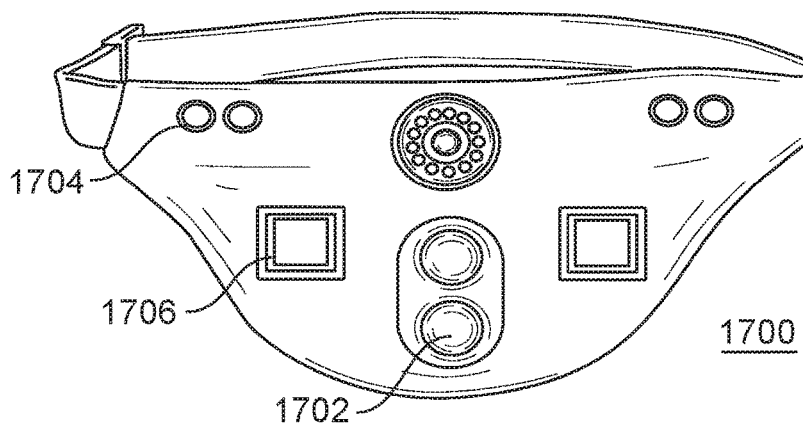
FIGS. 22A and 22B illustrate a fanny pack embodiment of a somatosensory terminal feedback device in accordance with various illustrative implementations.
Figure 22B:
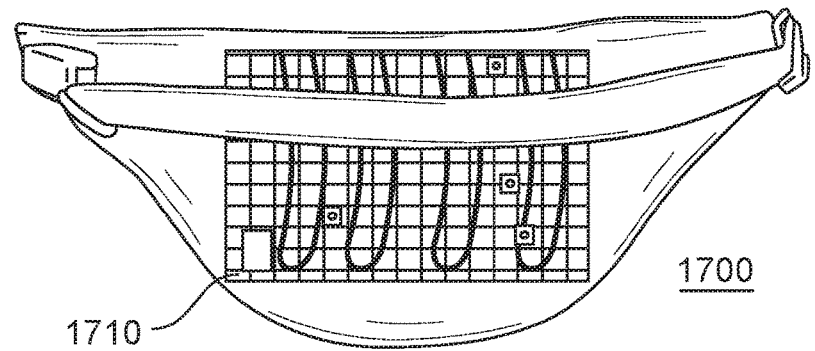
Figure 23:
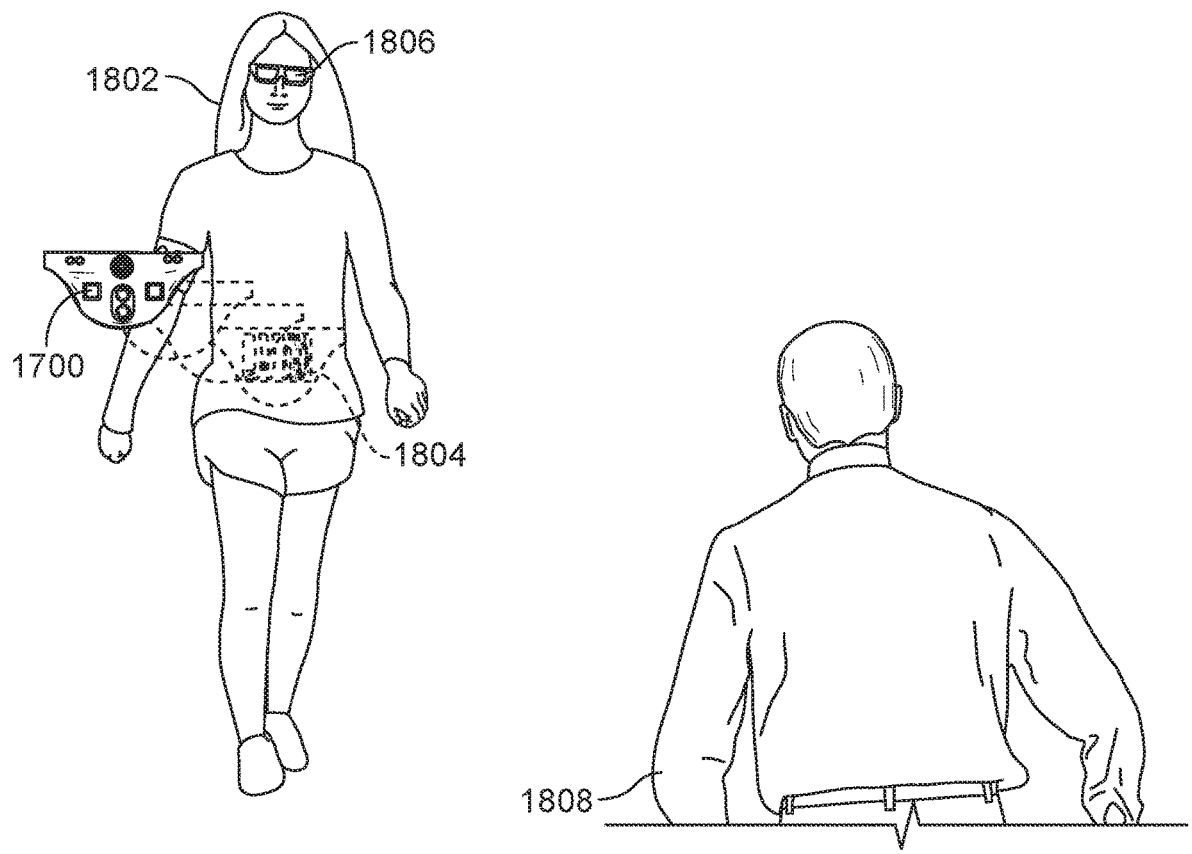
FIG. 23 illustrates detecting of a person using a somatosensory terminal feedback device in accordance with various illustrative implementations.

While a vest has been illustrated in various figures, the sensors and actuators can be integrated into other types of clothing. FIGS. 22A and 22B illustrate a fanny pack embodiment of a somatosensory terminal feedback device in accordance with various illustrative implementations. The fanny pack 2200 can integrate various types of sensors 2202, 2204, 2206, etc., comparable to the sensors described above. A vibrating interface 2210 can be integrated into the fanny pack 2200 to provide tactile input to the wearer of the fanny pack 2200. FIG. 23 illustrates detecting of a person using a somatosensory terminal feedback device in accordance with various illustrative implementations. A user 2302 wearing the fanny pack 2200 can receive tactile input for detecting an object and/or obstacle from the sensor data. Data from sensors external to the fanny pack can also be used. For example, sensors integrated into glasses 2306 can be used in combination with sensor data from the fanny pack. The sensor data can be used to detect a person 2308 ahead of the user 2302. The location of the user can be communicated to the user 2302 by actuating the ECPs or vibrators based upon the location of the person 2308. For example, the ECPs integrated on the left side of the fanny pack can be used to indicate that the person 2308 is ahead on the left side of the user 2302.

Figure 24:
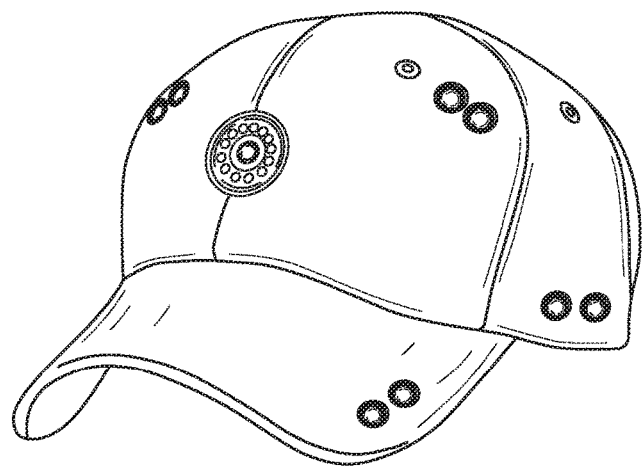
FIG. 24 illustrates a hat embodiment of a somatosensory terminal feedback device in accordance with various illustrative implementations.
Figure 25:
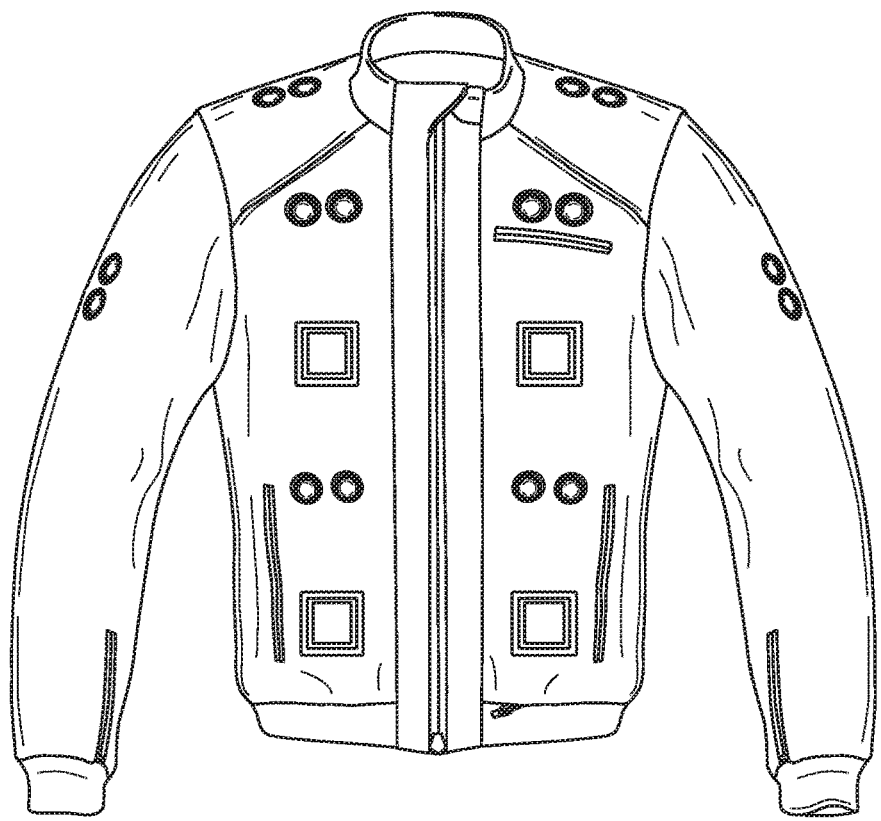
FIG. 25 illustrates a jacket embodiment of a somatosensory terminal feedback device in accordance with various illustrative implementations.

The sensors and/or actuators can be integrated into other types of clothing such as a hat, a coat, pants, helmets, etc. FIG. 24 illustrates a hat embodiment of a somatosensory terminal feedback device in accordance with various illustrative implementations, and FIG. 25 illustrates a jacket embodiment of a somatosensory terminal feedback device in accordance with various illustrative implementations. In one implementation, one or more sensors are integrated into a wearable object, e.g., a hat. The output from the one or more sensors can be sent to a controller that is located within another wearable object. The controller can then actuate the vibrotactile interface to provide the user with a tactile input regarding the user's environment. Accordingly, data from sensors integrated into various different wearable objects can be received by a single controller and used to control the vibrotactile interface that is located within another wearable object.

As described above, a somatosensory feedback wearable object can be used to provide feedback to a user regarding the user's environment. In one implementation, the somatosensory feedback wearable object allows a visually impaired person to sense objects near them based upon the tactile input received from the somatosensory feedback wearable object. Being able to sense objects in a user's environment is also useful for military, police, firefights, first responders, etc. A somatosensory feedback wearable object can provide 360 degree environmental object detection that allows these personal to feel their surrounding environment. The somatosensory feedback wearable object can also be used as a personal protection apparatus allowing individuals to be more aware of the physical surroundings. The somatosensory feedback may be integrated into a more robust communication and user interface system, including providing information to a visual display, such as a mobile phone, glasses or a personal heads-up-display, or to a remote location, such as for viewing by a third party. In some embodiments, a visual and/or audio indication can be used. The visual and/or audio indication can be used in conjunction with the vibrotactile input or could be used without any vibrotactile input. As a specific example, a police officer could be provided with a visual and/or auditory stimulation regarding a detected obstacle/threat based upon the sensor data. The visual stimulation could be provided via a light-emitting diode (LED) display, such as a transparent organic LED display, of tactile goggles worn by the police officer. In addition, vibrotactile input could be provided to the police officer associated with the detected obstacle/threat. The sensors integrated into the wearable object may comprise items tailored to a specific application. For example, use of a wearable object with somatosensory feedback in a military application may include radiation sensors, high frequency sensors (e.g., millimeter wave or terahertz wave), or infrared sensors.

The somatosensory feedback wearable object can also be coupled with additional sensors worn on an individual, such as but not limited to a gyroscope, an accelerometer, a global positioning system, an orientation sensor, etc. As a non-limiting example, the somatosensory feedback wearable object can incorporate a 3-axis accelerometer. The outputs from these sensors can be used to detect the position of the individual. For example, the individual's posture or current exercise position can be determined. Comparing the individual's position with a known baseline position can be used to provide input to the user regarding corrective behavior via the vibrating interface. For example, if a user needs to move forward to improve their posture, the vibrating interface can provide a tactile input in the front of the wearable object. This tactile input signals to the user that they need to move forward to move into a position indicative of better posture. This tactile input functions as near, real-time biofeedback that allows a user to experience enhanced sensation or sensory perception and enable the user to response to the biofeedback. As another example, the individual's posture during a particular exercise during physical therapy can be compared to the ideal posture. The data corresponding to the ideal posture can be stored in the controller or a remote computing device. Tactile input can be provided to the user indicating where their posture is less than ideal. A user can respond to this tactile input to improve their exercising position.

As another non-limiting example, a golfer can wear a somatosensory feedback wearable object. Data from various sensors, as described above, can provide real-time tactile input to the golfer indicating how a particular swing matched with data corresponding to a "correct" swing. For example, input can be in the form of right versus left supination or pronation corresponding to a wrist that overcompensated on a particular swing.

Figure 26:
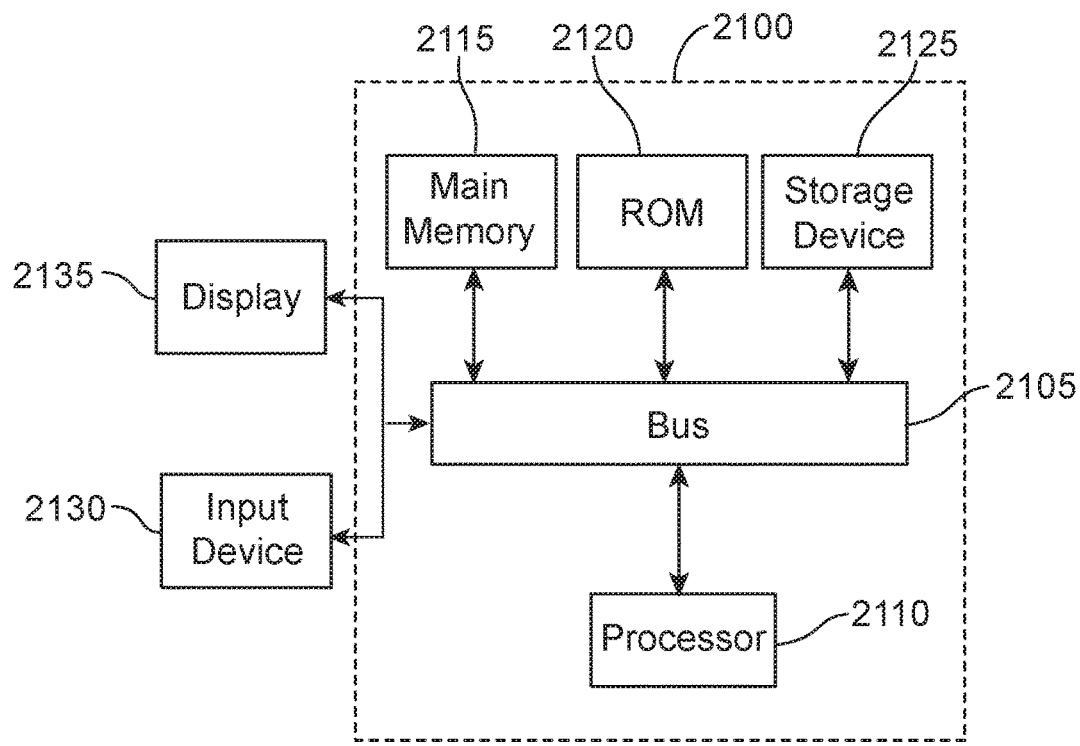
FIG. 26 is a block diagram of a computer system in accordance with an illustrative implementation.

FIG. 26 is a block diagram of a computer system in accordance with an illustrative implementation. The computing system 2600 includes a bus 2605 or other communication component for communicating information and a processor 2610 or processing circuit coupled to the bus 2605 for processing information. The computing system 2600 can also include one or more processors 2610 or processing circuits coupled to the bus for processing information. The computing system 2600 also includes main memory 2615, such as a random access memory (RAM) or other dynamic storage device, coupled to the bus 2105 for storing information, and instructions to be executed by the processor 2610. Main memory 2615 can also be used for storing position information, temporary variables, or other intermediate information during execution of instructions by the processor 2610. The computing system 2600 may further include a read only memory (ROM) 2610 or other static storage device coupled to the bus 2105 for storing static information and instructions for the processor 2610. A storage device 2625, such as a solid state device, magnetic disk or optical disk, is coupled to the bus 2605 for persistently storing information and instructions.

The computing system 2600 may be coupled via the bus 2605 to a display 2635, such as a liquid crystal display, or active matrix display, for displaying information to a user. An input device 2630, such as a keyboard including alphanumeric and other keys, may be coupled to the bus 2605 for communicating information and command selections to the processor 2610. In another implementation, the input device 2630 has a touch screen display 2635. The input device 2630 can include a cursor control, such as a mouse, a trackball, or cursor direction keys, for communicating direction information and command selections to the processor 2610 and for controlling cursor movement on the display 2635.

According to various implementations, the processes described herein can be implemented by the computing system 2600 in response to the processor 2610 executing an arrangement of instructions contained in main memory 2615. Such instructions can be read into main memory 2615 from another computer-readable medium, such as the storage device 2625. Execution of the arrangement of instructions contained in main memory 2615 causes the computing system 2100 to perform the illustrative processes described herein. One or more processors in a multi-processing arrangement may also be employed to execute the instructions contained in main memory 2615. In alternative implementations, hard-wired circuitry may be used in place of or in combination with software instructions to effect illustrative implementations. Thus, implementations are not limited to any specific combination of hardware circuitry and software.

Although an example computing system has been described in FIG. 26, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and tables in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations,"

without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A cane comprising:
a handle;
a pylon having a proximate end and a distal end, with a cane tip fitted at the distal end, the pylon connected to the handle at the proximate end;
a terminal feedback device operably and slidably connected to the pylon, wherein the terminal feedback device comprises:
a sliding retractor handle that is slidable relative to the pylon;
the sliding retractor handle connected to a plurality of satellite legs; and
a plurality of wheels connected with the plurality of satellite legs;
the terminal feedback device configured to move between an open position and a closed position when the sliding retractor handle moves along the pylon, the plurality of wheels extending below the cane tip in the open position and retracted above the cane tip in the closed position.

2. The cane of claim 1, wherein the terminal feedback device is lockable in the open position.

3. The cane of claim 2, wherein a top lock is positioned on the pylon between the handle and the sliding retractor handle.

4. The cane of claim 1, wherein each of the plurality of satellite legs is hingedly attached to a retractor strut.

5. The cane of claim 4, wherein each of the plurality of satellite legs is pivotable about a respective hinge towards the pylon.

6. A cane comprising:
a handle;
a pylon having a proximate end and a distal end, with a cane tip disposed at the distal end, and the pylon connected to the handle at the proximate end;
a terminal feedback device operably and slidably connected to the pylon, wherein the terminal feedback device comprises:
a sliding retractor handle having a passage therethrough within which the pylon is slidable;
a first support leg extending from the sliding retractor handle to a first satellite leg and a second support leg extending from the sliding retractor handle to a second satellite leg;
a first wheel operably connected to the first satellite leg and a second wheel operably connected to the second satellite leg;
the terminal feedback device configured to move between an open position and a closed position when the sliding retractor handle moves along the shaft, the plurality of wheels extending below the cane tip in the open position and retracted above the cane tip in the closed position.

7. A cane comprising:
a handle;
a pylon having a proximate end and a distal end, with a cane tip disposed at the distal end, and the pylon connected to the handle at the proximate end;
a terminal feedback device operably and slidably connected to the pylon, wherein the terminal feedback device comprises:
a sliding retractor handle that is slidable relative to the pylon;
the sliding retractor handle connected to a plurality of satellite legs consisting of a first satellite leg and a second satellite leg; and
a first wheel operably connected to the first satellite leg and a second wheel operably connected to the second satellite leg;
the terminal feedback device configured to move between an open position and a closed position when the sliding retractor handle moves along the pylon, the first wheel and the second wheel extending below the cane tip in the open position.

8. The cane of claim 7, wherein a top lock is positioned on the pylon between the handle and the sliding retractor handle.

9. The cane of claim 7, wherein each of the plurality of satellite legs is hingedly attached to a retractor strut.

10. The cane of claim 9, wherein each of the plurality of satellite legs is pivotable about a respective hinge towards the pylon.

* * * * *